US011988975B2

(12) United States Patent
Takeuchi et al.

(10) Patent No.: US 11,988,975 B2
(45) Date of Patent: May 21, 2024

(54) IMAGE FORMING APPARATUS

(71) Applicant: CANON KABUSHIKI KAISHA, Tokyo (JP)

(72) Inventors: Yasushi Takeuchi, Ibaraki (JP); Yukari Shibuya, Saitama (JP); Tatsuya Inoue, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/888,020

(22) Filed: Aug. 15, 2022

(65) Prior Publication Data

US 2023/0066316 A1 Mar. 2, 2023

(30) Foreign Application Priority Data

Aug. 16, 2021 (JP) ................................ 2021-132482

(51) Int. Cl.
*G03G 15/02* (2006.01)
*G03G 21/00* (2006.01)

(52) U.S. Cl.
CPC ..... *G03G 15/0258* (2013.01); *G03G 21/0023* (2013.01)

(58) Field of Classification Search
CPC ........... G03G 15/0266; G03G 21/0064; G03G 15/161; G03G 21/0011; G03G 15/065; G03G 15/1675
See application file for complete search history.

(56) References Cited

U.S. PATENT DOCUMENTS

| | | | | |
|---|---|---|---|---|
| 10,444,656 B2 | 10/2019 | Kanazawa | | |
| 2016/0195837 A1* | 7/2016 | Matsuura | ........... | G03G 15/1675 399/66 |
| 2018/0341192 A1* | 11/2018 | Kanazawa | ......... | G03G 15/0266 |
| 2019/0196365 A1* | 6/2019 | Arimura | ............ | G03G 15/0147 |
| 2023/0341806 A1* | 10/2023 | Agata | ................ | G03G 15/6585 |

FOREIGN PATENT DOCUMENTS

| | | |
|---|---|---|
| JP | 2006-234894 A | 9/2006 |
| JP | 2009-192568 A | 8/2009 |
| JP | 2018-200351 A | 12/2018 |

* cited by examiner

*Primary Examiner* — Jessica L Eley
(74) *Attorney, Agent, or Firm* — Venable LLP

(57) ABSTRACT

An image forming apparatus includes a rotatable photosensitive member, a charging member, a developing device, a blade, a detecting portion, and a controller. The controller causes the photosensitive member to rotate through one full circumference or more on the following conditions during a predetermined operation: (i) a voltage which is a discharge start voltage or more is applied to the charging member, and (ii) an operation condition of the developing device is a first condition on which an amount of fog toner deposited from the developer carrying member on the photosensitive member is less than an amount of the fog toner in a second condition which is an operation condition of the developing device during a sheet interval before the image formation during the continuous image formation is interrupted.

18 Claims, 13 Drawing Sheets

IMAGE FORMING APPARATUS

FIELD OF THE INVENTION AND RELATED ART

The present invention relates to an image forming apparatus, such as a copying machine, a printer, a facsimile machine, a printing device, or a multi-function machine having a plurality of functions of these machines, of an electrophotographic type.

In the image forming apparatus of the electrophotographic type, toner (transfer residual toner) and other deposited matter which remain on a surface of a rotatable photosensitive member such as a photosensitive drum after a toner image is transferred from the photosensitive member onto a transfer-receiving member (toner image-receiving member) should be removed. As a cleaning device for removing the transfer residual toner and other deposited matter, a cleaning device employing a constitution in which an elastic cleaning blade as a cleaning member is contacted to the photosensitive member has been widely used.

The transfer residual toner on the photosensitive member is blocked by the cleaning member, and thereafter forms a blocking layer in the neighborhood of a contact portion between the cleaning member and the photosensitive member. In the toner, toner particles and an external additive are contained, and the blocking layer is principally formed of the external additive. This blocking layer has a cleaning function and a lubricant supplying function to between the photosensitive member and the cleaning member.

In such an image forming apparatus, in order to continuously form a good image, it is important to properly maintain a friction coefficient (dynamic (kinetic) friction coefficient, dynamic (kinetic) friction force) between the photosensitive member and the cleaning member.

Japanese Laid-Open Patent Application (JP-A) 2006-234894 discloses that in the case where a torque current for driving the photosensitive member is detected and the torque current is a threshold or more, an operation in which toner of a toner band is supplied to the cleaning member and the surface of the photosensitive member is abraded with the toner is executed. In a technique of JP-A 2006-234894, by the above-described operation, an "image flow" which is a phenomenon that an electric discharge product is deposited on the surface of the photosensitive member by the influence of electric discharge on the photosensitive member by a charging member and thus a charging property lowers and a latent image is disturbed is intended to be suppressed.

Incidentally, in the case where high-area ratio images are continuously formed in the image forming apparatus as described above, a supply amount of the external additive to the neighborhood of the contact portion between the photosensitive member and the cleaning member increases, and therefore, the friction coefficient between the photosensitive member and the cleaning member lowers in some instances. By this, the friction force of the surface of the photosensitive member by the cleaning member lowers, so that an image defect such as toner fusion or the like occurs in some instances. That is, aggregate of about 1 μm (length with respect to a movement direction of the surface of the photosensitive member) due to the toner generates on the surface of the photosensitive member and growth to about 10 μm (length with respect to the movement direction of the surface of the photosensitive member) by deposition of the toner on this aggregate occurs in some instances. Then, this aggregate disturbs exposure of the surface of the photosensitive member to light and appears as a white void (such that the toner is not deposited on a part of a portion on which the toner is to be deposited and becomes white spots) on the image. Such a phenomenon is referred to as "toner fusion".

SUMMARY OF THE INVENTION

A principal object of the present invention is to provide an image forming apparatus capable of suppressing an occurrence of an image defect such as toner fusion due to a lowering in friction force of a surface of a photosensitive member by a cleaning member.

According to an aspect of the present invention, there is provided an image forming apparatus comprising: a rotatable photosensitive member; a charging member configured to electrically charge the photosensitive member; a developing device including a developer carrying member for carrying a developer and configured to develop a latent image formed on the photosensitive member; a blade configured to clean the photosensitive member; a detecting portion configured to detect information correlating with a driving torque of the photosensitive member; and a controller configured to execute, on the basis of a detection result of the detecting portion, a predetermined operation in which during execution of continuous image formation for continuously forming images on a plurality of recording materials, the image formation is interrupted and an interval between consecutive recording materials is increased, and then the photosensitive member is rotated, wherein the controller causes the photosensitive member to rotate through one full circumference or more on the following conditions during the predetermined operation: (i) a voltage which is a discharge start voltage or more is applied to the charging member, and (ii) an operation condition of the developing device is a first condition, and wherein on the first condition, an amount of fog toner deposited from the developer carrying member on the photosensitive member is smaller than an amount of the fog toner on a second condition which is an operation condition of the developing device during a sheet interval step before the image formation during the continuous image formation is interrupted.

Further features of the present invention will become apparent from the following description of exemplary embodiments with reference to the attached drawings.

DESCRIPTION OF THE EMBODIMENTS

An image forming apparatus according to the present invention will be specifically described with reference to the drawings.

Embodiment 1

1. Constitution and Operation of Image Forming Apparatus

Figure 1:
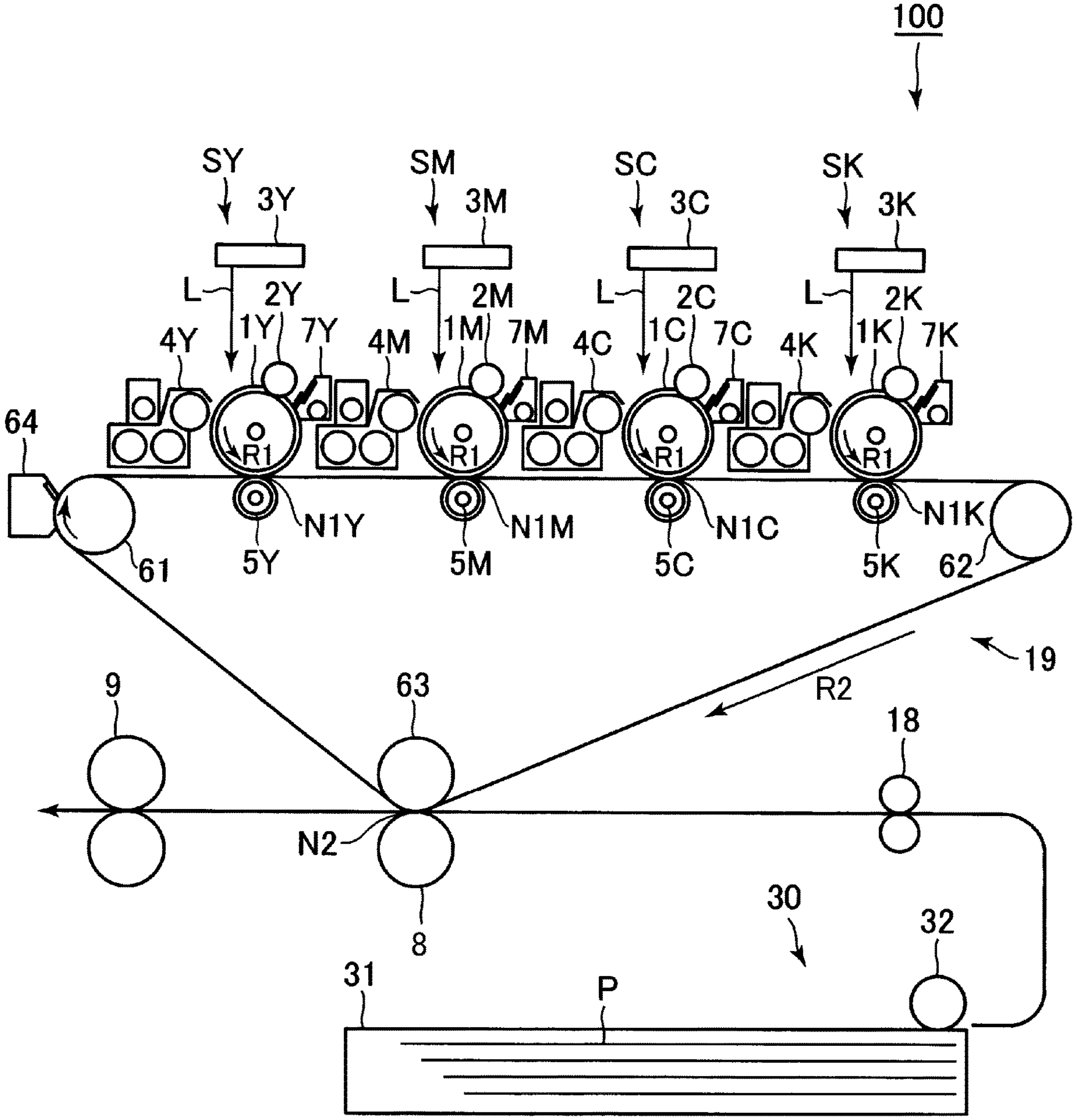
FIG. 1 is a schematic sectional view of an image forming apparatus.

FIG. 1 is a schematic sectional view of an image forming apparatus 100 in this embodiment according to the present invention. The image forming apparatus 100 in this embodiment is a laser beam printer which is capable of forming a full-color image by using an electrophotographic type method and which employs an intermediary transfer type system.

The image forming apparatus 100 includes, as a plurality of image forming portions (stations), four image forming portions SY, SM, SC, and SK for forming toner images of colors of yellow (Y), magenta (M), cyan (C), and black (K), respectively. Incidentally, elements having the same or corresponding functions and constitutions in the respective image forming portions SY, SM, SC, and SK are collectively described by omitting suffixes Y, M, C, and K for representing elements for associated colors in some cases.

Figure 2:
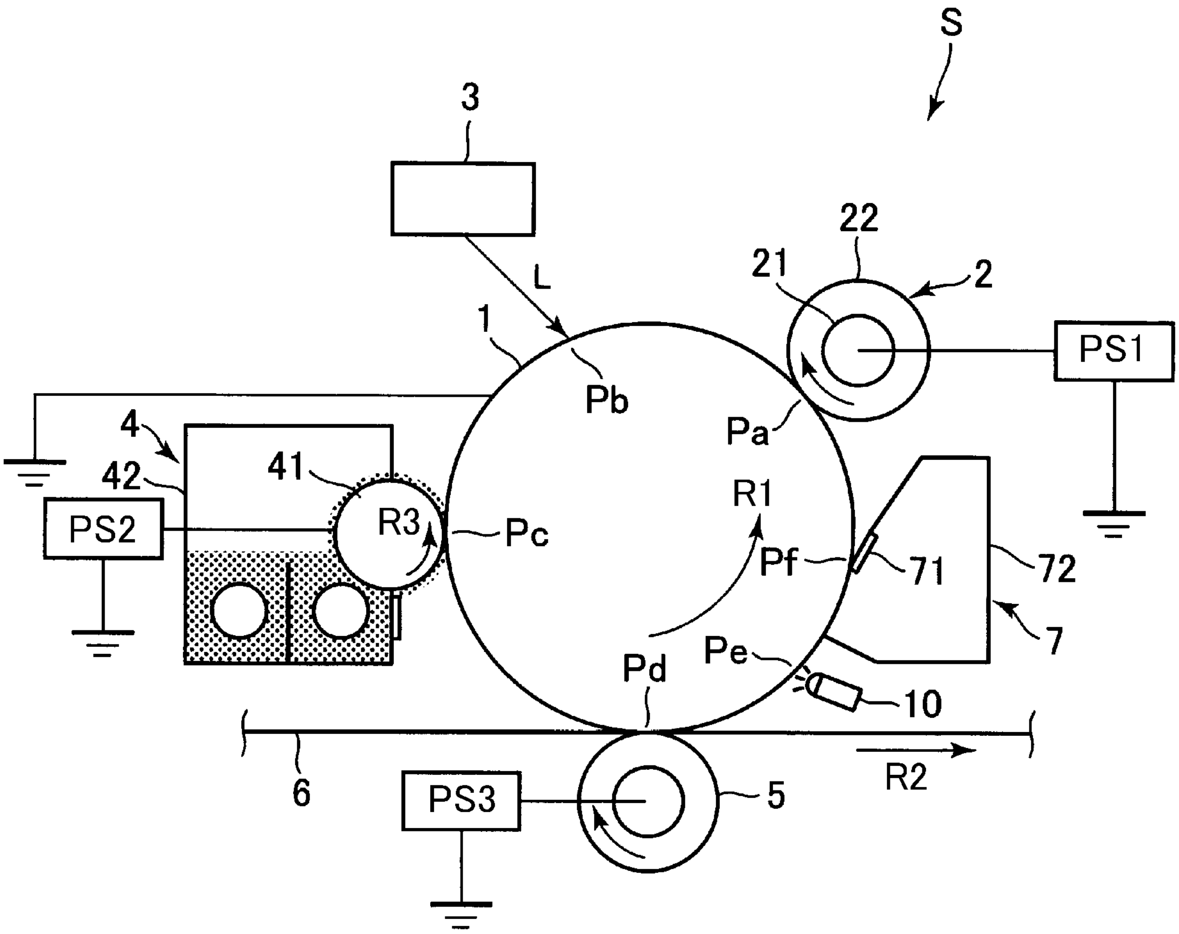
FIG. 2 is a schematic sectional view of an image forming portion.

FIG. 2 is a schematic sectional view showing a single image forming portion S as a representative. In this embodiment, the image forming portion S is constituted by including a photosensitive drum 1, a charging roller 2, an exposure device 3, a developing device 4, a primary transfer roller 5, a cleaning device 7, and the like, which are described later. The four image forming portions SY, SM, SC, and SK are disposed in a line along a movement direction of a surface of an intermediary transfer belt 6 described later. In this embodiment, a distance between adjacent image forming portions S (distance between adjacent positions each where the associated photosensitive drum 1 and the associated primary transfer roller 5 are in contact with each other) is 100 mm.

The photosensitive drum 1 which is a rotatable drum-type (cylindrical) photosensitive member (electrophotographic photosensitive member) as an image bearing member is rotationally driven in an arrow R1 direction (counterclockwise direction) in FIGS. 1 and 2 by a drum driving motor MTR1 (FIG. 3) as a photosensitive member driving means (photosensitive member driving portion). In this embodiment, the photosensitive drum 1 is an organic photoconductor (OPC) drum having a negative chargeability as a charging characteristic, and is 100 mm (outer diameter: 31.85 mm) in length with respect to a circumferential direction. In this embodiment, the photosensitive drum 1 is rotationally driven about a center supporting axis at a peripheral speed (process speed) of 200 mm/sec. In this embodiment, the photosensitive drum 1 is constituted by superposedly coating an undercoat layer, a photocharge generating layer and a charge transporting layer (thickness: about 20 μm) in a named order on the surface of an aluminum cylinder (electroconductive drum support).

Figure 3:
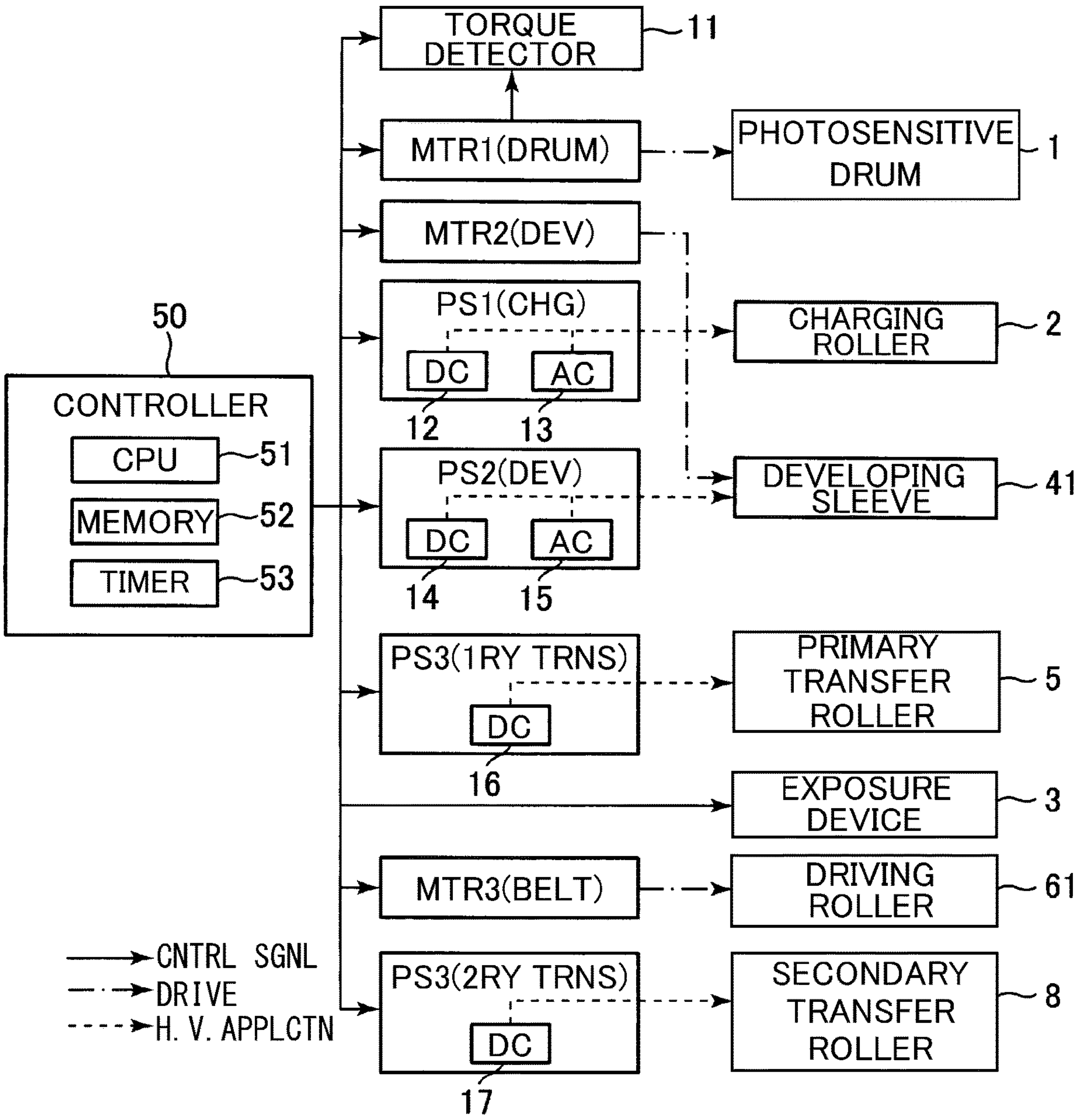
FIG. 3 is a schematic block diagram showing a control mode of the image forming apparatus.

A surface of the rotating photosensitive drum 1 is electrically charged uniformly to a predetermined polarity (negative in this embodiment) and a predetermined potential by a charging roller 2 which is a roller-type charging member (contact charging member) as a charging means (charging portion). The charging roller 2 is disposed in contact with the surface of the photosensitive drum 1 and is rotated with rotation of the photosensitive drum 1. The charging roller 2 electrically charges the surface of the photosensitive drum 1 by using a discharge phenomenon occurring in a minute gap formed between itself and the photosensitive drum 1 on at least one of sides upstream and downstream of the contact portion, between the charging roller 2 and the photosensitive drum 1, with respect to a rotational direction of the photosensitive drum 1 (contact charging type). In this embodiment, the charging roller 2 is a rubber roller which includes a core metal 21 and an elastic layer 22 formed of a rubber material as an elastic material around the core metal 21 and which is 320 mm in length with respect to a longitudinal direction (rotational axis direction) and 14 mm in diameter. With respect to a rotational direction of the photosensitive drum 1, a position on the photosensitive drum 1 of which surface is charged by the charging roller 2 is a charging position Pa. The charging roller 2 charges the surface of the photosensitive drum 1 by the discharge phenomenon occurring in the above-described minute gap, but the contact portion between the charging roller 2 and the photosensitive drum 1 may be regarded and considered as the charging position Pa. During a charging step, to the core metal 21 of the charging roller 2, a predetermined charging voltage (charging bias) is applied by a charging power source (high-voltage power source) PS1 as a charging voltage applying portion. In this embodiment, the charging power source PS1 includes a DC power source portion 12 for outputting a DC component (charging DC bias) and an AC power source 13 for outputting an AC component (charging AC bias) (FIG. 3). In this embodiment, during the charging step, to the charging roller, an oscillating voltage in a superimposed form of the charging DC bias of −700 V and the charging AC bias having a peak-to-peak voltage (Vpp) sufficiently and stably generating electric discharge is applied as the charging bias by the charging power source PS1. The peak-to-peak voltage sufficiently and stably generating the electric discharge is two times or more a discharge start voltage in the case where only the DC voltage is applied to the charging roller 2. By this, the surface of the photosensitive drum 1 is electrically charged uniformly to a surface potential (charge potential, dark(-portion) potential) of −700 V.

The charged surface of the photosensitive drum 1 is scanning-exposed to light depending on image information by the exposure device 3 as an exposure means (exposure portion), so that an electrostatic latent image (electrostatic image) is formed on the photosensitive drum 1. In this embodiment, the exposure device 3 is a laser beam scanner using a semiconductor laser. The exposure device 3 outputs laser light L modulated correspondingly to an image signal (image information), sent, to the image forming apparatus 100, from an image reading device (not shown) connected to the image forming apparatus 100 or from a host processing device such as a personal computer. Then, the exposure device 3 irradiates the uniformly charged surface of the rotating photosensitive drum 1 with the laser light L. By this, an absolute value of a potential of the surface of the photosensitive drum 1 at a portion where the photosensitive drum surface is irradiated with the laser light L lowers, so that the electrostatic latent image corresponding to the image information is formed on the surface of the photosensitive drum 1. With respect to the rotational direction of the photosensitive drum 1, a position on the photosensitive drum 1 of which surface is irradiated with the laser light L by the exposure device 3 is an exposure position Pb. Incidentally, in this embodiment, with respect to the rotational direction of the photosensitive drum 1, a distance (along the surface of the photosensitive drum 1) from the charging position Pa to the exposure position Pb is 20 mm.

The electrostatic latent image formed on the photosensitive drum 1 is developed (visualized) by being supplied with the toner by the developing device 4 as a developing means (developing portion), so that the toner image (developer image) is formed on the photosensitive drum 1. In this embodiment, the developing device 4 employs a two-component contact development type using a two-component developer containing, as the developer, toner (non-magnetic toner particles) and a carrier (magnetic carrier particles). The developing device 4 includes a developer container 42 containing the two-component developer and a developing sleeve 41 as a developing member (developer carrying member). The developing sleeve 41 is formed of a non-magnetic material and is rotatably supported by the developer container 42, and at a hollow portion thereof, a magnet roller (not shown) as a magnetic field generating means is fixedly provided to the developer container 42. In this embodiment, the developing device 4 carries, on the surface of the developing sleeve 41, a magnetic brush constituted by the two-component developer and performs a development while bringing the magnetic brush into contact with the photosensitive drum 1. In this embodiment, the toner charged to the same polarity as a charge polarity (negative polarity in this embodiment) of the photosensitive drum 1 is deposited on an exposure portion (image portion), on the photosensitive drum 1, where an absolute value of a potential is lowered by subjecting the surface of the photosensitive drum 1 to the exposure to the laser light after uniformly charging the surface of the photosensitive drum 1 (reverse development). In this embodiment, a normal charge polarity of the toner which is the charge polarity of the toner during the development is the negative polarity. With respect to the rotational direction of the photosensitive drum 1, a position on the photosensitive drum 1 where supply of the toner (development) is made by the developing device 4 (developing sleeve 41) is a developing position Pc. During a developing step, the developing sleeve 41 is rotationally driven in an arrow R3 direction (counterclockwise direction) in FIG. 2 by a development driving motor as a development driving means (development driving portion). That is, the developing sleeve 41 is rotationally driven so that the photosensitive drum 1 and the developing sleeve 41 are moved in directions opposite to each other in the developing position Pc. Further, during the developing step, to the developing sleeve 41, a predetermined developing voltage (developing bias) is applied by a development power source (high-voltage power source) PS2 as a developing voltage applying portion. In this embodiment, during the developing step, the development power source PS2 includes a development DC power source portion 14 for outputting a DC component (development DC bias) and an AC power source portion 15 for outputting an AC component (development AC bias) (FIG. 3). In this embodiment, during the developing step, to the developing sleeve 41, an oscillating voltage in a superimposed form of the developing bias of −550 V and the developing AC bias for stably depositing the toner on the image portion (exposure portion) on the photosensitive drum 1 is applied as the developing bias. Here, the developing bias is set so that a potential difference between itself and the charge potential (−700 V in this embodiment) of the photosensitive drum 1 in the developing position Pc becomes a predetermined potential difference Vback (150 V in this embodiment). The charge potential of the photosensitive drum 1 in the developing position Pc is a potential when the surface of the photosensitive drum 1 charged by the charging roller 2 reaches the developing position Pc with rotation of the photosensitive drum 1. The toner in the two-component developer conveyed from the inside of the developer container 42 onto the developing sleeve 41 is selectively deposited in the developing position Pc on the photosensitive drum 1 correspondingly to the electrostatic latent image on the photosensitive drum 1 by an electric field by the developing bias, so that the electrostatic latent image is developed as the toner image.

The intermediary transfer belt 6 constituted by an endless belt as an intermediary transfer member is disposed opposed to the four photosensitive drums 1Y, 1M, 1C, and 1K. The intermediary transfer belt 6 is extended and stretched with a predetermined tension by, as a plurality of stretching rollers (supporting rollers), a driving roller 61, a tension roller 62, and a secondary transfer opposite roller 63. The intermediary transfer belt is rotated (circulated and moved) in an arrow R2 direction (clockwise direction) in FIG. 1 by rotationally driving the driving roller 61 by a belt driving motor MTR3 (FIG. 3) as an intermediary transfer member driving means (intermediary transfer member driving portion). On an inner peripheral surface side of the intermediary transfer belt 6, correspondingly to the photosensitive drums 1Y, 1M, 1C, and 1K, primary transfer rollers 5Y, 5M, 5C, and 5K which are roller-type primary transfer members as primary transfer means are provided, respectively. Each of the primary transfer rollers 5 is pressed toward the associated photosensitive drum 1 and is contacted to the photosensitive drum 1 via the intermediary transfer belt 6, and forms a primary transfer portion (primary transfer nip) N1 where the photosensitive drum 1 and the intermediary transfer belt 6 are in contact with each other. The tension roller 62, the secondary transfer opposite roller 63, and each of the primary transfer rollers 5 are rotated with the rotation of the intermediary transfer belt 6. The toner image formed on the photosensitive drum 1 is transferred (primary-transferred), in the primary transfer portion N1, onto the rotating intermediary transfer belt 6 by the action of the associated primary transfer roller 5. During a primary transfer step, to the primary transfer roller 5, a primary transfer voltage (primary transfer bias) which is a DC voltage of an opposite polarity (positive polarity in this embodiment) to the normal charge polarity of the toner is applied by a primary transfer power source (high-voltage power source) PS3 as a primary transfer voltage applying portion. In this embodiment, the primary transfer power source PS3 includes a primary transfer DC power source portion 16 (FIG. 3) for outputting a DC voltage (primary transfer DC bias). For example, during full-color image formation, the color toner images of Y, M, C, and K formed on the respective photosensitive drums 1 are successively transferred superposedly onto the intermediary transfer belt 6. Incidentally, the respective image forming portions SY, SM, SC, and SK successively form the color images of Y, M, C, and K in a manner such that each of the respective color images is formed by being delayed by a color interval delay time calculated from a distance between associated image forming portions S and the process speed and then the color images are superposed on the intermediary transfer belt 6. A position on the photosensitive drum 1 where the primary-transfer of the toner image onto the intermediary transfer belt 6 with respect to the rotational direction of the photosensitive drum 1 occurs is a primary transfer position Pd (corresponding to the above-described primary transfer portion N1).

On an outer peripheral surface side of the intermediary transfer belt 6, in a position opposing the secondary transfer opposite roller 63, a secondary transfer roller 8 which is a roller-type secondary transfer member as a secondary transfer means is provided. The secondary transfer roller 8 is pressed with a transfer pressing force toward the secondary transfer opposite roller 63 and is contacted to the secondary transfer opposite roller 63 via the intermediary transfer belt 6, and forms a secondary transfer portion (secondary transfer nip) N2 where the intermediary transfer belt 6 and the secondary transfer roller 8 are in contact with each other. The secondary transfer roller 8 is rotated with the rotation of the intermediary transfer belt 6. The toner image formed on the intermediary transfer belt 6 is transferred (secondary-transferred), in the secondary transfer portion N2, onto the recording material P nipped and fed between the intermediary transfer belt 6 and the secondary transfer roller 8. During a secondary transfer step, to the secondary transfer roller 8, a secondary transfer voltage (secondary transfer bias) which is a DC voltage of an opposite polarity (positive polarity in this embodiment) to the normal charge polarity of the toner is applied by a secondary transfer power source (high-voltage power source) PS4 as a secondary transfer voltage applying portion. In this embodiment, the secondary transfer power source PS3 includes a secondary transfer DC power source portion 17 (FIG. 3) for applying a DC voltage (secondary transfer DC bias). The recording material (transfer material, recording medium, sheet, form) P is fed from a feeding portion 30 at a predetermined control timing. That is, the recording materials P are accommodated in a cassette 31 as a recording material accommodating portion of a feeding portion 30. The recording materials P are separated and fed one by one from the cassette 31 by a feeding roller 32 or the like as a feeding member of the feeding portion 30. This recording material P is conveyed to a registration roller pair 18 as a conveying member and then, is conveyed by the registration roller pair 18 to the secondary transfer portion N2 while being timed to the toner image on the intermediary transfer belt 6. Incidentally, the recording material P is not limited to paper, but may also be a plastic sheet or the like. In this embodiment, a transfer device 19 for transferring the toner images, formed on the photosensitive drums 1, onto the recording material P is constituted by the intermediary transfer belt 6, the plurality of stretching rollers 61 to 63, the respective primary transfer rollers 5, the secondary transfer roller 8, and the like.

The recording material P on which the toner image is transferred is separated from the surface of the intermediary transfer belt 6 and is fed to a fixing device 9 as a fixing means (fixing portion). In this embodiment, the fixing device 9 is a heating roller fixing device, and the recording material P carrying the (unfixed) toner image thereon is heated and pressed, so that the toner image is fixed (melted, stuck). The recording material P on which the toner image is fixed is discharged (outputted) as an image-formed product (print, copy) to an outside of an apparatus main assembly of the image forming apparatus 100.

On the other hand, the electric charges on the surface of the photosensitive drum 1 after the primary transfer step are removed by being exposed to light by a charge removing device 10 as a charge removing means (charge removing portion). In this embodiment, the charge removing device 10 is constituted by including an LED array. With respect to the rotational direction of the photosensitive drum 1, a position where irradiation of charge removing light by the charge removing device 10 is made is charge removing position Pe. On the other hand, the electric charges on the surface of the photosensitive drum 1 after the primary transfer step are removed by being exposed to light by a charge removing device 10 as a charge removing means (charge removing portion). In this embodiment, the charge removing device 10 is constituted by including an LED array. With respect to the rotational direction of the photosensitive drum 1, a position where irradiation of charge removing light by the charge removing device 10 is made is charge removing position Pe. On the surface of the photosensitive drum 1 after the primary transfer step potential hysteresis formed through the respective steps of the charging, the exposure (electrostatic latent image formation), the development and the primary transfer remains. By the exposure by the charge removing device 10 in the charge removing position Pe, a residual potential on the surface of the photosensitive drum can be eliminated to substantially 0 V.

Further, toner (transfer residual toner) and other deposited matter which remain on the surface of the photosensitive drum 1 after the primary transfer step are removed and collected from the surface of the photosensitive drum 1 by the cleaning device 7 as a cleaning means (cleaning portion). The cleaning device 7 includes a cleaning blade 71 as a cleaning member and a cleaning container 72 for accommodating the transfer residual toner and the like which are removed from the surface of the photosensitive drum 1. In this embodiment, the cleaning blade 71 is formed with a urethane rubber as an elastic material. The cleaning blade 71 has a flat plate-like shape which has a predetermined length in each of a longitudinal direction disposed along a rotational axis direction of the photosensitive drum 1 and a widthwise direction substantially perpendicular to the longitudinal direction and which has a predetermined thickness. The cleaning blade 71 is fixedly supported by a cleaning container 72 (or a supporting member fixed thereto) at one end portion (fixed end) with respect to the widthwise direction, and is contacted to the surface of the photosensitive drum 1 at an edge of the other end portion (free end) on the photosensitive drum 1 side. With respect to the rotational direction of the photosensitive drum 1, a position on the photosensitive drum 1 where the toner is removed by the cleaning blade 71 (i.e., a contact portion of the photosensitive drum 1 with the cleaning blade 71) is a cleaning blade position Pf. The cleaning blade 71 is disposed so that the free end side thereof is positioned upstream of the fixed and side thereof with respect to the movement direction of the surface of the photosensitive drum 1, and is contacted to the surface of the photosensitive drum 1 with respect to a direction (counter direction to the movement direction of the surface of the photosensitive drum 1) in which the free end thereof faces toward an upstream side. In this embodiment, the length of the cleaning blade 71 in the longitudinal direction (axial direction) is 330 mm. Further, in this embodiment, the cleaning blade 71 is pressed against the photosensitive drum 1 with a linear pressure of 25 to 35 gf/cm. Incidentally, the linear pressure refers to a pressure per unit length of the cleaning blade 71 with respect to the longitudinal direction and is a value obtained by dividing a total contact pressure of the cleaning blade 71 to the photosensitive drum 1 by the length of the contact portion between the photosensitive drum 1 and the cleaning blade 71 with respect to the longitudinal direction. This linear pressure can be acquired in a manner such that a load converter is mounted on the photosensitive drum 1 (or a member-to-be-contacted for measurement which is likened to the photosensitive drum 1 and the cleaning blade 71 is pressed against the surface of the photosensitive drum 1, and then a load thereof is measured.

Further, toner (transfer residual toner) and another deposited matter which remain on the surface of the intermediary transfer belt 6 after a secondary transfer step are removed and collected from the surface of the intermediary transfer belt 6 by a belt cleaning device 64 as an intermediary transfer member cleaning means.

2. Control Mode

FIG. 3 is a schematic block diagram showing a control mode of a principal part of the image forming apparatus 100 of this embodiment. The image forming apparatus 100 includes a controller 50 that carries out integrated control of operations of the respective portions of the image forming apparatus 100. The controller 50 includes a CPU 51 as a computation control means (computation control portion) which is a central element for performing computation processing, a memory portion 52 constituted by a ROM and a RAM as storing means (storing portions), and the like. Further, the controller 50 includes a timer 53 as a time measuring means (time measuring portion), an interface portion (input/output circuit) (not shown) for controlling input/output (communication) of signals between the controller 50 and devices connected thereto, and the like. In the RAM, which is a rewritable memory, information inputted to the controller 50, detected information, a computation result, and the like are stored. In accordance with a program stored in the ROM, the CPU 51 carries out the integrated control of the operations of the respective portions of the image forming apparatus 100 while using the RAM as a working area. In a relation with this embodiment, the controller 50 carries out drive of the drum driving motor MTR1, the development driving motor MTR2, and the belt driving motor MTR3, bias application by the respective power sources PS1, PS2, PS3, and PS4, processing of image information, and the like, for example.

That is, the controller 50 sends control signals to the drum driving motor MTR1, the development driving motor MTR2, and the belt driving motor MTR3. In response to these signals, the drum driving motor MTR1 drives the photosensitive drum 1, the development driving motor MTR2 drives the developing sleeve 41, and the belt driving motor MTR3 drives the intermediary transfer belt 6 (the driving roller 61). Here, in this embodiment, the image forming apparatus 100 includes a torque detecting circuit 11 as a torque detecting means (torque detecting portion) for detecting a value correlating with a driving torque of the photosensitive drum 1 by the drum driving motor MTR1. As the is torque detecting means, for example, it is possible to arbitrary use a means available from known torque detecting means. In this embodiment, as the drum driving motor MTR1 a stepping motor is used. Further, in this embodiment, the torque detecting circuit 11 detects a torque current component for generating a torque in the stepping motor. By this, the torque detecting circuit 11 is capable of detecting a motor torque, generated in the drum driving motor MTR1, as the value correlating with the driving torque of the photosensitive drum 1 by the drum driving motor MTR1. However, the present invention does not limit a structure and a control type of the drum driving motor MTR1. For example, the stepping motor is capable of detecting a motor torque on the basis of a torque current component in vector control, and a DC brush-less motor is capable of detecting a motor torque by detecting a current value or a PWM value of a voltage thereof. The torque detecting circuit 11 inputs, to the controller 50, a signal indicating a detection result of the driving torque (motor torque). The controller 50 causes the memory portion 52 therein to store information on the driving torque (motor torque) acquired by the torque detecting circuit 11. Incidentally, a value (index value), correlating with the driving torque of the photosensitive drum 1 by the drum driving motor MTR1, subjected to processing in the controller 50 is not limited to the torque value itself, but may also be a current value or a voltage value. Here, the value correlating with the driving torque of the photosensitive drum 1 by the drum driving motor MTR1, acquired by the torque detecting circuit 11 is also simply referred to as the "driving torque".

Further, the controller 50 sends control signals to the charging power source PS1, the development power source PS2, the primary transfer power source PS3, and the secondary transfer power source PS4. In response to the control signal, the charging power source PS1 applies the charging bias from the DC power source portion 12 and the AC power source portion 13 to the charging roller 2. Further, in response to the control signal, the development power source PS2 applies the developing bias from the DC power source portion 14 and the AC power source portion 15 to the developing sleeve 41. Further, in response to the control signal, the primary transfer power source PS3 applies the primary transfer bias from the primary transfer DC power source portion 16 to the primary transfer roller 5. Further, in response to the control signal, the secondary transfer power source PS4 applies the secondary transfer bias from the secondary transfer DC power source portion 17 to the secondary transfer roller 8.

Further, the controller 50 sends a control signal corresponding to the image signal to the exposure device 3. The exposure device 3 outputs the laser light L modulated depending on the signal. Simultaneously with or before the sending of the image signal to the exposure device 3 by the controller 50, in the memory portion 52 of the controller 50, data of an image to be formed is written (stored).

Incidentally, although illustration is omitted, in this embodiment, the drum driving motor MTR1, the development driving motor MTR2, the charging power source PS1, the developing power source PS2, the primary transfer power source 3, and the torque detecting circuit 11 are provided independently for each of the image forming portions SY, SM, SC, and SK. Here, the image forming apparatus 100 executes a job (print job), which is a series of operations, which is started by a single start instruction, and in which the image is formed and outputted on a single recording material P or on a plurality of recording materials P. The job includes an image forming step, a pre-rotation step, a sheet (paper) interval step in the case where the images are formed on the plurality of recording materials P, and a post-rotation step, in general. The image forming step is a period in which formation of an electrostatic latent image for the image actually formed and outputted on the recording material P, formation of the toner image, primary transfer of the toner image and secondary transfer of the toner image are carried out, and during image formation (image forming period) refers to this period. Specifically, a timing during the image formation is different between positions where the respective steps of the formation of the electrostatic latent image, the toner image formation, the primary transfer of the toner image and the secondary transfer of the toner image are performed. The pre-rotation step is a period in which a preparatory operation, before the image forming step, from an input of the start instruction until the image is started to be actually formed, is performed. The sheet interval step (recording material interval step, image interval step) is a period corresponding to an interval between a recording material P and a (subsequent) recording material P when the images are continuously formed on the plurality of recording materials P (continuous image formation). The post-rotation step is a period in which a post-operation (preparatory operation) after the image forming step is performed. During non-image formation (non-image formation period) is a period other than during image formation and includes the periods of the pre-rotation step, the sheet interval step, and the post-rotation step, which are described above, and further includes a period of a pre-multi-rotation step which is a preparatory operation during turning-on of a power source of the image forming apparatus 100 or during restoration from a sleep state.

3. Toner Fusion Suppressing Operation

Next, a toner fusion suppressing operation in this embodiment will be described. Incidentally, in this embodiment, description will be made by paying attention to control of the toner fusion suppressing operation in one image forming portion S as a representative of the plurality of image forming portions S. As regards an example of control of the toner fusion suppressing operation in the plurality of image forming portions, description will be made later in an embodiment 4.

3-1. Outline of Toner Fusion Suppressing Operation

In the image forming apparatus 100, in the case where high-area ratio images are continuously formed or in the like case, a supply amount of an external additive to the neighborhood of the cleaning position Pf increases, and therefore, a friction coefficient (dynamic (kinetic) friction coefficient, dynamic friction force) between the photosensitive drum 1 and the cleaning blade 71 lowers in some instances. By this, an abrading force of the surface of the photosensitive drum 1 by the cleaning blade 71 lowers, so that an image defect such as the "toner fusion" occurs in some instances. Particularly, in the case where an abrading means of the photosensitive drum 1 is only the cleaning blade 71, an abrading property of the surface of the photosensitive drum 1 by the cleaning blade 71 is largely influenced by the friction coefficient between the photosensitive drum 1 and the cleaning blade 71. Incidentally, the high-area ratio image refers to an image in which an image-area ratio is high. Further, the high-area ratio image refers to a rate (ratio) of a toner deposition area to an area of an image forming region (a toner image formable region) on the recording material P or on the photosensitive drum 1 corresponding to a single recording material P set in advance corresponding to a size, a category, or the like of the recording material P. The image-area ratio is also called a print ratio, an image duty, or the like.

Figure 4:
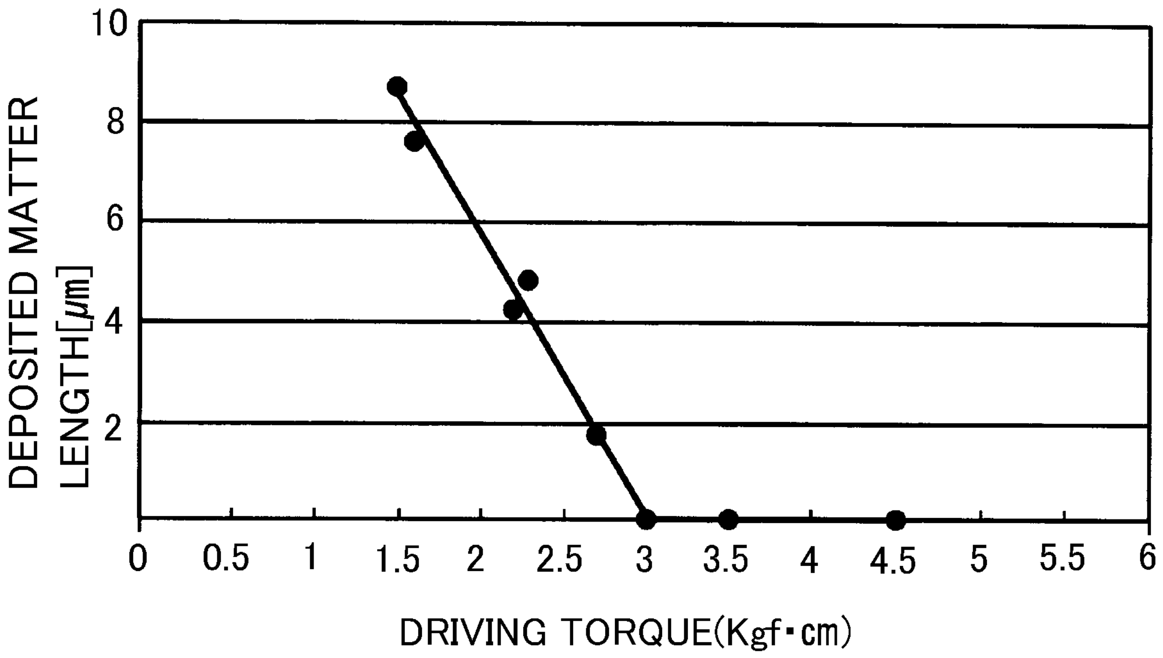
FIG. 4 is a graph showing a relationship between a driving torque of a photosensitive drum and growth of a deposited matter.

FIG. 4 is a graph showing an example of a relationship between a state acquired by the torque detecting circuit 11 and growth of a deposited matter (aggregate) due to the toner on the photosensitive drum 1. The abscissa of FIG. 4 represents an average driving torque measured as described later during the continuous image formation. Further, the ordinate of FIG. 4 represents a length of the deposited matter (aggregate) due to the toner on the photosensitive drum 1 with respect to a rotational direction (surface movement direction) of the photosensitive drum 1, measured after images are continuously formed on 50,000 sheets of A4-size recording materials (sheets) P. As is understood from FIG. 4, growth of the deposited matter (aggregate) due to the toner on the photosensitive drum 1 was suppressed with an increasing driving torque. Then, when the driving torque is increased up to a certain threshold (3.0 kgf·cm in this embodiment), the growth of the deposited matter (aggregate) due to the toner on the photosensitive drum 1 was not observed. This shows that the deposited matter on the photosensitive drum 1 can be removed with the cleaning blade 71 by increasing the driving torque, i.e., by increasing the friction coefficient between the photosensitive drum 1 and the cleaning blade 71.

Therefore, in this embodiment, the image forming apparatus 100 executes the toner fusion suppressing operation by interrupting the image formation in the case where discrimination that the abrading force of the surface of the photosensitive drum 1 by the cleaning blade 71 lowers during the continuous image formation is made. In this embodiment, the toner fusion suppressing operation includes at least a torque increasing operation described later, typically, includes the torque increasing operation and a deposited matter removing operation described later.

3-2. Operation Procedure

Figure 5:
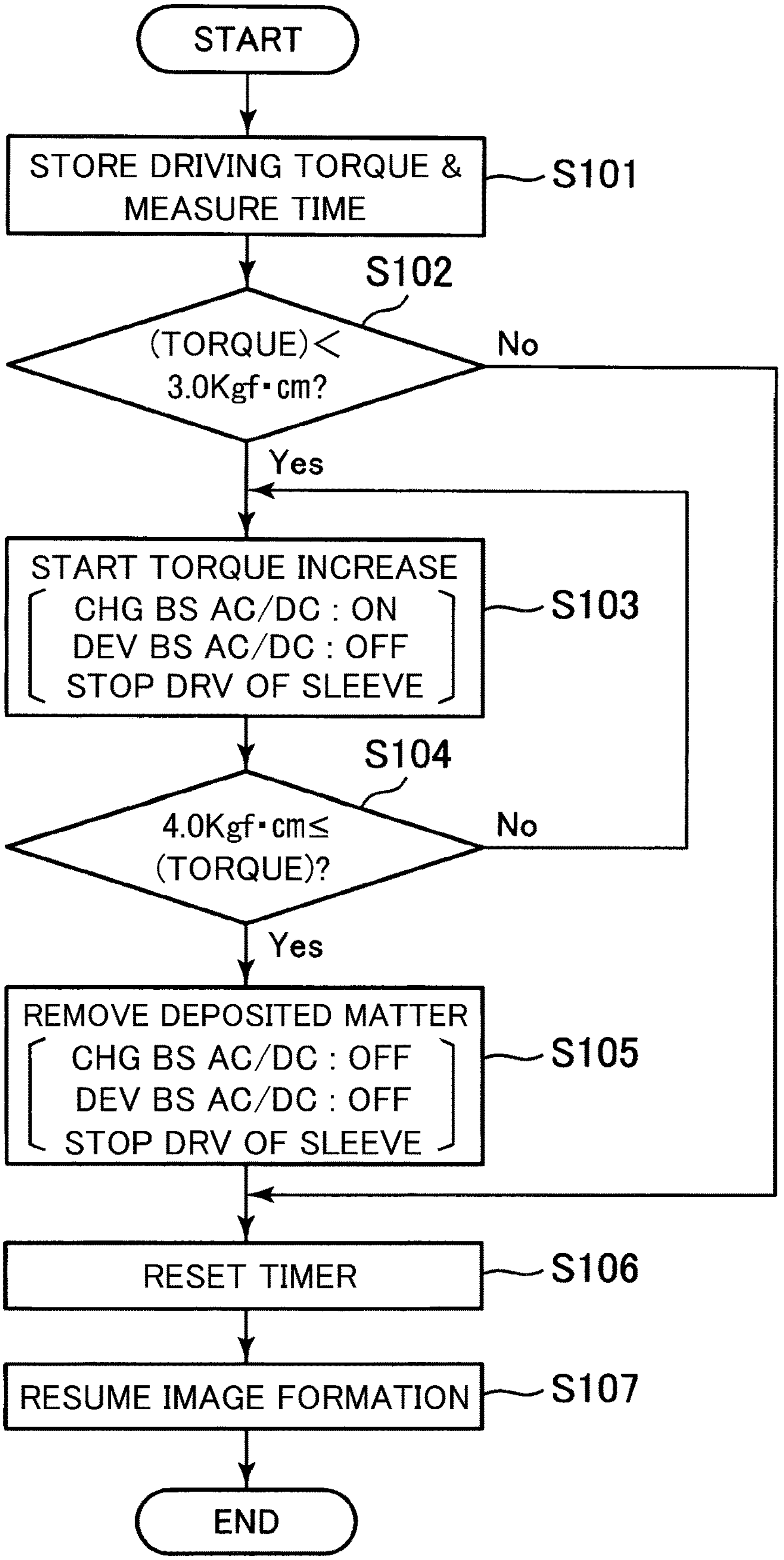
FIG. 5 is a flowchart of a toner fusion suppressing operation in an embodiment 1.

FIG. 5 is a flowchart showing an outline of procedure of the toner fusion suppressing operation (toner fusion suppressing sequence) in this embodiment.

When a job (continuous image forming job in this embodiment) is started, during execution of an operation of the job (during rotation of the photosensitive drum 1), the controller 50 causes the memory portion 52 to store the driving torque acquired by the torque detecting circuit 11 (S101). Further, in S101, the controller 50 starts measurement of a time by a timer 53. In this embodiment, the controller 50 performs sampling of 100 ms×10 times every 50 sec and causes the memory portion 52 to store an average of sampling results of the ten times as a driving torque at that time. Further, in this embodiment, the controller 50 causes the memory portion 52 to store the driving torque ten times in total in 500 sec. Then, in this embodiment, at a time of a lapse of 500 sec, the controller 50 discriminates whether or not the driving torque is less than 3.0 kgf·cm as a torque increasing operation threshold (start threshold) five times or more of the ten times in which the driving torque is stored in the memory portion 52 (S102). That is, in this embodiment, the controller 50 discriminates that the driving torque became smaller than the start threshold in the case where the average of the driving torques acquired with time during the execution of the job operation satisfies a predetermined condition (less than the start threshold five times or more of the ten times). Thus, the controller 50 makes the discrimination on the basis of a value obtained by subjecting a plurality of detection results of the torque detecting circuit 11 to predetermined statistical processing (averaging processing), so that it is possible to suppress that the toner fusion suppressing operation is frequently executed in the case where the driving torque lowers instantaneously or in the like case. By this, it is possible to suppress that downtime (period in which the image cannot be formed) occurs more than necessary.

In the case where the controller 50 discriminated in S102 that the driving torque became less than 3.0 kgf·cm ("Yes"), the controller 50 interrupts the image formation and executes the torque increasing operation described later in the sheet interval step (S103). This is because in this case, discrimination can be made that the controller 50 is capable of discriminating that removing power of the deposited matter (aggregate) due to the toner on the photosensitive drum 1 by the cleaning blade 71 is insufficient. Thereafter, the controller 50 acquires a driving torque detection result by the torque detecting circuit 11 during the torque increasing operation and discriminates whether or not the driving torque becomes not less than 4.0 kgf·cm as a torque increasing operation end threshold (end threshold) (S104). Incidentally, also at this time, the controller 50 can make the discrimination on the basis of a value obtained by subjecting a plurality of detection results of the torque detecting circuit 11 to the predetermined statistical processing (averaging processing). For example, an average for each of sampling periods of 100 ms can be regarded as the driving torque at that time. Further, as in this embodiment, it is preferable from a viewpoint of sufficiently increasing the driving torque in the torque increasing operation that the end threshold is set at a value larger than the start threshold. Further, in the case where the controller 50 discriminated in S104 that the driving torque became 4.0 kgf·cm (end threshold) or more ("Yes"), the controller 50 executes the deposited matter removing operation described later (S105). The controller 50 ends the deposited matter removing operation when it executes the deposited matter removing operation for a predetermined time, and the controller 50 resets the timer 53 to an initial value (0 in this embodiment) (S106), and then restores the sequence to the image formation (S107).

On the other hand, in the case where the controller 50 discriminated in S102 that the driving torque is not less than 3.0 kgf·cm (start threshold), i.e., is 3.0 kgf·cm (start threshold) or more ("No"), the following operation is performed. That is, without executing the toner fusion suppressing operation (the torque increasing operation and the deposited matter removing operation), the controller 50 resets the timer 53 to the initial value (0 in this embodiment) (S106), and then continues the image formation (S107). This is because in this case, the controller 50 can discriminate that the deposited matter (aggregate) due to the toner on the photosensitive drum 1 is removed by the cleaning blade 71.

Figure 6:
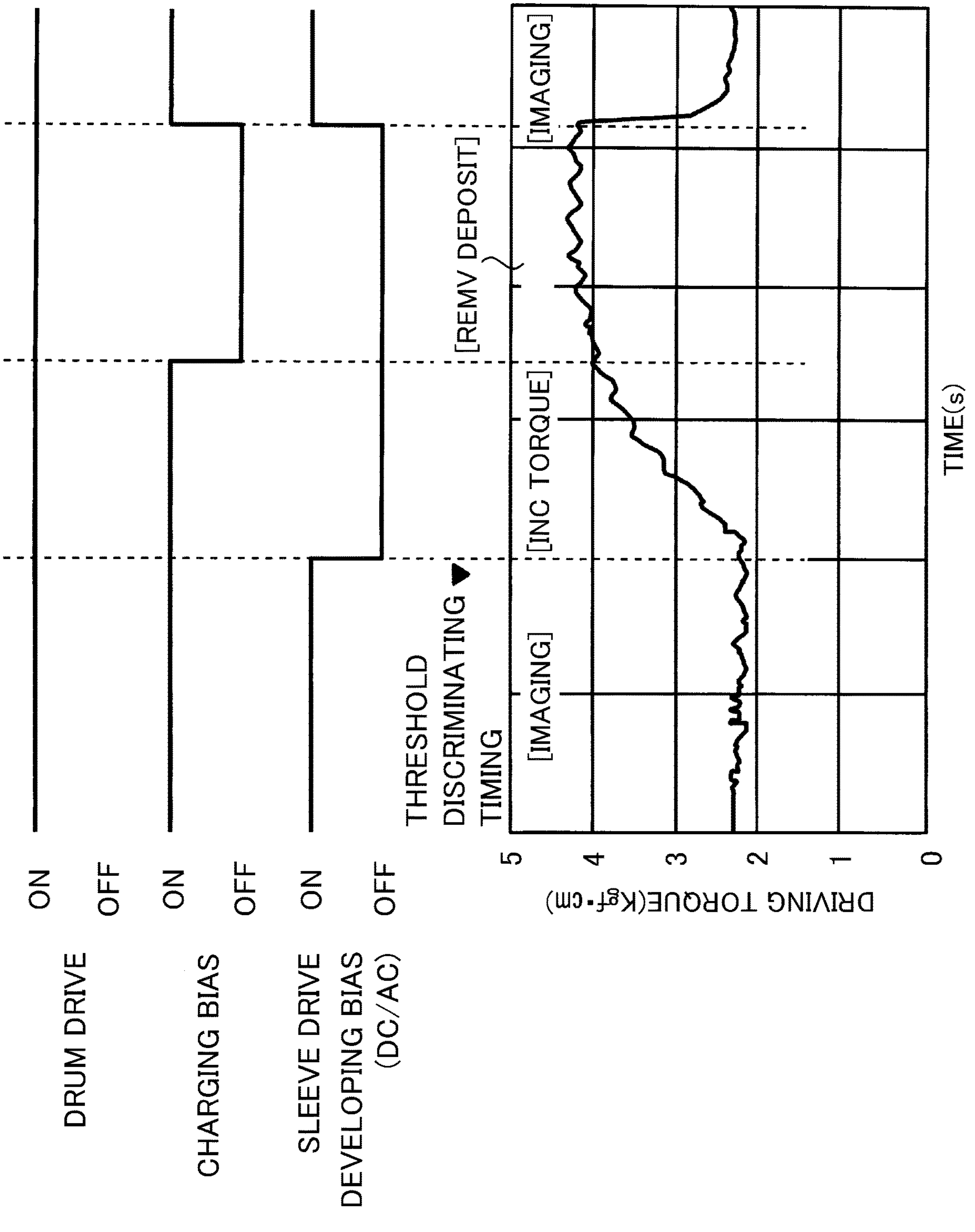
FIG. 6 includes a sequence chart of the toner fusion suppressing operation and a progression of the driving torque of the photosensitive drum in the embodiment 1.

The torque increasing operation (torque increasing sequence) in this embodiment will be further described. FIG. 6 is a schematic chart showing an example of a relationship between the toner fusion suppressing operation and progression of the driving torque of the photosensitive drum 1 in this embodiment. An upper stage of FIG. 6 is a sequence diagram of drive of the photosensitive drum 1 and the developing sleeve 41 and application of the charging bias and the developing bias in the toner fusion suppressing operation (the torque increasing operation and the deposited matter removing operation). Further, a lower stage of FIG. 6 is a graph showing progression of the driving torque of the photosensitive drum 1 in a period corresponding to the upper-stage sequence diagram.

When the torque increasing operation is started, as regards the developing device 4, both the developing DC bias and the developing AC bias are turned off from the bias application state, and the drive (rotation) of the developing sleeve 41 is stopped. That is, supply of the toner (containing the external additive) from the developing sleeve 41 to the photosensitive drum 1 is substantially stopped. On the other hand, in this embodiment, as regards the charging roller 2, even when the torque increasing operation is started, the bias application state during the image formation is maintained, so that both the charging DC bias and the charging AC bias are kept ON. That is, electric discharge generates between the charging roller 2 and the photosensitive drum 1, and the state in which the surface of the photosensitive drum 1 is charged by the charging roller 2 is maintained. Then, in a state in which the charging bias is turned on, the developing bias is turned off, and the drive (rotation) of the developing sleeve 41 is stopped, the photosensitive drum 1 is driven (rotated) through at least one-full circumference. By this, in a state in which supply of the external additive from the developing sleeve 41 to the photosensitive drum 1 is provided, the electric discharge is generated between the charging roller 2 and the photosensitive drum 1, so that the friction coefficient between the photosensitive drum 1 and the cleaning blade 71 can be increased. That is, the electric discharge is generated between the charging roller 2 and the photosensitive drum 1, and an electric discharge product is deposited on the surface of the photosensitive drum 1, so that the friction coefficient between the photosensitive drum 1 and the cleaning blade 71 can be increased. Incidentally, it turns out that this electric discharge product is sufficiently removed by abrasion between the photosensitive drum 1 and the cleaning blade 71 during the deposited matter removing operation executed subsequently to the torque increasing operation or during subsequent image formation, and thus an image flow is sufficiently suppressed.

Here, the drive (rotation) of the photosensitive drum 1 through at least one-full circumference in the above-described torque increasing operation refers to more specifically rotation of the photosensitive drum 1 until a leading end of the surface of the photosensitive drum 1, with respect to the rotational direction, which passes through the charging position Pa in a state in which the electric discharge is generated between the charging roller 2 and the photosensitive drum 1 and then which passes through the developing position Pc in a state in which supply of the toner (containing the external additive) from the developing sleeve 41 to the photosensitive drum 1 is stopped (in this embodiment, the rotation of the developing sleeve 41 is stopped, and the developing DC bias and the developing AC bias are turned off). By this, at least once over full circumference of the photosensitive drum 1, the friction coefficient between the photosensitive drum 1 and the cleaning blade 71 can be increased. An upper limit of a rotation time (the number of times of rotation) of the photosensitive drum 1 in the torque increasing operation can be appropriately set from viewpoints of a degree of the increase in friction coefficient between the photosensitive drum 1 and the cleaning blade 71, suppression of the downtime, and the like. For example, as the upper limit of the rotation time (the number of times of rotation) of the photosensitive drum 1 in the torque increasing operation, it is possible to cite about 60 sec in terms of the time (in this embodiment, 120 turns in terms of the number of times of rotation, i.e., a peripheral length of the photosensitive drum 1: 100 mm and a peripheral speed of the photosensitive drum 1: 200 mm/sec).

Incidentally, in this embodiment, the operation is shifted from the operation in the image forming step to the torque increasing operation in the sheet interval step while continuing the drive (rotation) of the photosensitive drum 1, but the present invention is not limited to such a constitution. After the image forming step, the drive (rotation) of the photosensitive drum 1 is once interrupted and then the torque increasing operation may be started.

Further, in this embodiment, setting of the charging bias in the torque increasing operation is setting corresponding to setting for during the image formation, but the present invention is not limited to such a constitution. When setting such that the electric discharge generates between the charging roller 2 and the photosensitive drum 1 is made, the setting of the charging bias in the torque increasing operation may be setting different from the setting for during the image formation. For example, the following setting may be made from the viewpoint of reducing a possibility that movement of the carrier (carrier deposition) of the two-component developer from the developing sleeve 41 to the photosensitive drum 1 in the developing position Pc. That is, an absolute value of the charging DC bias can be made smaller than that during the image formation so that a potential difference between itself and the potential of the developing sleeve 41 in a state in which the developing bias (particularly the developing DC bias) corresponds to the above-described Vback. For example, in the constitution of this embodiment, as the charging DC bias in the torque increasing operation, it is possible to cite about −150 V (may also be about −170 V). At this time, the charging AC bias can be maintained at a value of setting corresponding to the setting for during the image formation, for example. Incidentally, whether or not the voltage is a voltage at which the electric discharge is generated between the charging member and the photosensitive member (i.e., a voltage not less than a discharge start voltage) can be acquired by measuring, for example, a current flowing through the charging member while increasing an absolute value of the voltage applied to the charging member. That is, an inclination of a change in current relative to a change in voltage varies between an undischarged region and a discharge region, so that the discharge start voltage can be acquired by acquiring a voltage corresponding to an inflection point of the inclination.

Further, in this embodiment, the drive (rotation) of the developing sleeve 41 is stopped in the torque increasing operation, but the present invention is not limited to such a constitution. When the supply of the toner (containing the external additive) from the developing sleeve 41 to the photosensitive drum 1 can be sufficiently reduced, in the torque increasing operation, the developing sleeve 41 may be driven (rotated) at a rotational speed slower than a rotational speed during the image formation.

Further, the image forming apparatus 100 employs a constitution including a moving mechanism for moving the developing member between a first position during the image formation (during development) and a second position further separated from the photosensitive member than in the first position in some instances. In such a constitution, by disposing the developing sleeve 41 in a position further separated from the photosensitive drum 1 than during the image formation, the supply of the toner (containing the external additive) from the developing sleeve 41 to the photosensitive drum 1 may be sufficiently reduced. Also, in this case, the developing sleeve 41 may be at rest or rotated at a rotational speed slower than during the image formation.

Further, in this embodiment, both the developing DC bias and the developing AC bias are turned off in the torque increasing operation, but the present invention is not limited to such a constitution. When the supply of the toner (containing the external additive) from the developing sleeve 41 to the photosensitive drum 1 can be sufficiently reduced, at least one of the developing DC bias and the developing AC bias may be turned on. For example, in the torque increasing operation, the developing DC bias is turned off and the developing AC bias is turned on (for example, setting corresponding to the setting for during the image formation).

3-4. Deposited Matter Removing Operation

The deposited matter removing operation (deposited matter removing sequence) in this embodiment will be further described. Similarly as in the case of the torque increasing operation, description will be made by making reference to FIG. 6.

During the torque increasing operation, when the driving torque acquired by the torque detecting circuit 11 becomes 4.0 kgf·cm (end threshold) or more, the sequence is shifted from the torque increasing operation to the deposited matter removing operation.

When the deposited matter removing operation is started, as regards the charging roller 2, both the charging DC bias and the charging AC bias are turned off from a state of bias application in the torque increasing operation. That is, a state, in which the electric discharge does not generate between the charging roller 2 and the photosensitive drum 1 and thus the surface of the photosensitive drum 1 is not charged, is formed. On the other hand, as regards the developing device 4, even when the deposited matter removing operation is started, a stopped state of the bias application and the drive (rotation) of the developing sleeve 41 is maintained. That is, a state in which the supply of the toner (containing the external additive) from the developing sleeve 41 to the photosensitive drum 1 is stopped is substantially maintained. Then, the photosensitive drum 1 is driven (rotated) through at least one-full circumference in a state in which the charging bias is turned on, the developing bias is turned off, and the drive (rotation) of the developing sleeve 41 is stopped. By this, the friction coefficient between the photosensitive drum 1 and the cleaning blade 71 does not readily fluctuate, so that the deposited matter removing operation (rotation of the photosensitive drum 1) can be continued while maintaining the driving torque, acquired by the torque detecting circuit 11, at about 4.0 kgf·cm. Then, in a state in which the friction coefficient between the photosensitive drum 1 and the cleaning blade 71 is increased, the deposited matter (aggregate) due to the toner which can generate on the photosensitive drum 1 can be removed. Further, continuous increase in friction coefficient between the photosensitive drum 1 and the cleaning blade 71 is capable of being suppressed, and therefore, it becomes possible to prevent an occurrence of turning-up of the cleaning blade 71. That is, when the rotation of the photosensitive drum 1 is continued under the setting for the torque increasing operation even after the driving torque of the photosensitive drum 1 reaches the end threshold, the friction coefficient between the photosensitive drum 1 and the cleaning blade 71 continuously increases, so that there is a possibility that the turning-up of the cleaning blade 71 occurs. By continuing the rotation of the photosensitive drum 1 under the setting for the deposited matter removing operation, while preventing the occurrence of the is turning-up of the cleaning blade 71, it is possible to remove the deposited matter (aggregate) due to the toner which can generate on the photosensitive drum 1. Thereafter, when a predetermined time has elapsed, the deposited matter removing operation is ended, and the image formation is resumed.

Here, the drive (rotation) of the photosensitive drum 1 through at least one-full circumference in the above-described deposited matter removing operation refers to more specifically rotation of the photosensitive drum 1 until a leading end of the surface of the photosensitive drum 1, with respect to the rotational direction, which passes through the charging position Pa in a state in which the generation of the electric discharge between the charging roller 2 and the photosensitive drum 1 is stopped and then which passes through the developing position Pc in a state in which supply of the toner (containing the external additive) from the developing sleeve 41 to the photosensitive drum 1 is stopped (in this embodiment, the rotation of the developing sleeve 41 is stopped, and the developing DC bias and the developing AC bias are turned off). By this, at least once over full circumference of the photosensitive drum 1, the surface of the photosensitive drum 1 can be abraded by the cleaning blade 71. An upper limit of a rotation time (the number of times of rotation) of the photosensitive drum 1 in the deposited matter removing operation can be appropriately set from viewpoints of a degree of the removal of the deposited matter (aggregate) due to the toner from the photosensitive drum 1, suppression of the downtime, and the like. For example, as the upper limit of the rotation time (the number of times of rotation) of the photosensitive drum 1 in the torque increasing operation, it is possible to cite about 60 sec in terms of the time (in this embodiment, 120 turns in terms of the number of times of rotation, i.e., a peripheral length of the photosensitive drum 1: 100 mm and a peripheral speed of the photosensitive drum 1: 200 mm/sec).

Incidentally, in this embodiment, the operation is shifted from the torque increasing operation to the deposited matter removing operation while stopping the drive (rotation) of the developing sleeve 41, but the present invention is not limited to such a constitution. For example, when the operation is shifted from the torque increasing operation to the deposited matter removing operation, from the viewpoint of prevention of the turning-up of the cleaning blade or the like, the drive (rotation) of the developing sleeve 41 may be performed in a period corresponding to less than one-full circumference of the photosensitive drum 1, for example. At this time, at least one of the developing DC bias and the developing AC bias is turned on (for example, setting corresponding to the setting for during the image formation).

Further, in this embodiment, on the basis of the driving torque acquired by the torque detecting circuit 11, the operation was shifted from the torque increasing operation to the deposited matter removing operation, but the present invention is not limited to such a constitution. For example, from the viewpoint of suppression of the downtime or the like, on the basis of a time, the operation may be shifted from the torque increasing operation to the deposited matter removing operation. In this case, when the torque increasing operation is executed for a predetermined time, the torque increasing operation is ended and the deposited matter removing operation is started. That is, in this case, irrespective of a detection result of the torque detecting circuit 11, the controller 50 controls transition (shift) from the torque increasing operation to the deposited matter removing operation. Further, similarly as this embodiment, the controller 50 may set an upper limit to an execution time of the torque increasing operation simultaneously with control based on the driving torque acquired by the torque detecting circuit 11. In this case, even when the driving torque acquired by the torque detecting circuit 11 does not reach the end threshold, when a predetermined time has elapsed, the torque increasing operation is ended and the deposited matter removing operation is started. Further, an upper limit of an execution time of the torque increasing operation may be set at an upper limit of an entire execution time of the toner fusion suppressing operation. In this case, even when the driving torque acquired by the torque detecting circuit 11 does not reach the end threshold, when a predetermined time has elapsed, the torque increasing operation is ended and the image formation is resumed. That is, in this case, the toner fusion suppressing operation includes only the torque increasing operation of the torque increasing operation and the deposited matter removing operation. By this, while suppressing the downtime, the friction coefficient between the photosensitive drum 1 and the cleaning blade 71 can be increased as soon as possible. Further, also, in this case, by abrasion between the photosensitive drum 1 and the cleaning blade 71 during subsequent image formation or the like, the deposited matter (aggregate) due to the toner which can generate on the photosensitive drum 1 can be removed to some extent.

Further, in this embodiment, in the deposited matter removing operation, both the charging DC bias and the charging AC bias are turned off, but the present invention is not limited to such a constitution. When setting such that the electric discharge does not generate between the charging roller 2 and the photosensitive drum 1 is made, at least one of the charging DC bias and the charging AC bias may be turned on.

Further, similarly as in the case of the torque increasing operation, in the deposited matter removing operation, the developing sleeve 41 may be driven (rotated) at a rotational speed slower than the rotational speed during the image formation.

Further, similarly as in the case of the torque increasing operation, in the deposited matter removing operation, at least one of the developing DC bias and the developing AC bias may be turned on.

4. Effect

As described above, the image forming apparatus 100 of this embodiment includes the rotatable photosensitive member 1, the charging member 2 for electrically charging the surface of the photosensitive member 1, the charging power source PS1 for applying a voltage to the charging member 2, the exposure portion 3 for forming the electrostatic image on the charged surface of the photosensitive member 1 by exposing the charged surface of the photosensitive member 1 to light, the rotatable developing member 41 for forming the toner image on the surface of the photosensitive member 1 by supplying toner to the electrostatic image, the transfer device 19 for transferring the toner image formed on the photosensitive member 1, the cleaning member 71 for removing the toner from the surface of the photosensitive member 1 in contact with the surface of the photosensitive member 1, the driving portion MTR1 for driving the photosensitive member 1, the detecting portion 11 for detecting the value correlating with the driving torque of the photosensitive member 1 by the driving portion MTR1, and the controller capable of executing the operation (torque increasing operation), on the basis of the detection result of the detecting portion during continuous image formation in which image formation for forming the toner image transferred onto the recording material P is continuously carried out for transferring the toner images onto the plurality of recording materials P, wherein the image formation is interrupted and the voltage generating discharge between the charging member 2 and the photosensitive member 1 is applied to the charging member 2, and then the photosensitive member 1 is rotated through at least one full circumference in a state in which rotation of the developing member 41 is stopped or in the state in which the developing member 41 is rotated at the rotational speed lower than the rotational speed during the image formation. In this embodiment, the controller 50 executes the operation (torque increasing operation) in the case where the detection result of the detecting portion 11 acquired with time during the continuous image formation shows that the driving torque lowers so as to satisfy the predetermined condition. Further, in this embodiment, the controller 50 executes the operation (torque increasing operation) in the case where the driving torque indicated by the average of the plurality of detection results of the detecting portion 11 acquired during execution of the continuous image formation becomes smaller than the predetermined threshold. Particularly, in this embodiment, the controller 50 executes the operation (torque increasing operation) in the case where the average, of the predetermined number or more, of the plurality of averages acquired during execution of the continuous image formation becomes smaller than the predetermined threshold.

Further, in this embodiment, after the above-described operation (torque increasing operation) and before the image formation is resumed, the controller 50 is capable of executing another operation (deposited matter removing operation) in which the voltage is not applied to the charging member 2 or the voltage which does not generate the discharge between the charging member 2 and the photosensitive member 1 is applied to the charging member 2 and in which the photosensitive member 1 is rotated through at least one full circumference in the state in which rotation of the developing member 2 is stopped or in the state in which the developing member 41 is rotated at the rotational speed lower than the rotational speed during the image formation. In this embodiment, the controller 50 executes the above-described operation (torque increasing operation) in the case where the detection result of the detecting portion 11 acquired with the time during the execution of the continuous image formation shows that the driving torque lowers so as to satisfy the predetermined condition, and executes the above-described another operation (deposited matter removing operation) in the case where the detection result of the detecting portion 11 acquired with the time during the execution of the above-described operation (torque increasing operation) shows that the driving torque increases so as to satisfy the predetermined condition. Further, in this embodiment, the controller 50 executes the above-described operation (torque increasing operation) in the case where the driving torque indicated by the average of the plurality of detection results of the detecting portion 11 acquired during the continuous image formation becomes smaller than the predetermined first threshold, and executes the above-described another operation (deposited matter removing operation) in the case where the driving torque indicated by the average of the plurality of detection results of the detecting portion 11 acquired during the continuous image formation becomes the predetermined second threshold or more. In this embodiment, the second predetermined threshold is larger than the first predetermined threshold. Further, the controller 50 may execute the above-described operation (torque increasing operation) in the case where the detection result of the detecting portion 11 acquired with the time during the execution of the continuous image formation shows that the driving torque lowers so as to satisfy the predetermined condition, and may execute the above-described another operation (deposited matter removing operation) after the predetermined time has elapsed from the start of the above-described operation (torque increasing operation).

Further, in this embodiment, the controller 50 applies the oscillating voltage in the superimposed form of the AC component and the DC component to the charging member 2 in the above-described operation (torque increasing operation). At this time, in the above-described operation (torque increasing operation), the controller 50 is capable of applying, to the charging member 2, the oscillating voltage in the superposed form of the DC component, which is the same polarity as the polarity during the image formation and which is smaller in absolute value than during the image formation. Further, in this embodiment, the image forming apparatus 100 includes the developing power source for applying the voltage to the developing member 41, and the controller 50 does not apply the voltage to the developing member 41 in the above-described operation (torque increasing operation). Further, in this embodiment, the above-described cleaning member 71 is the cleaning blade.

Thus, in this embodiment, an idling operation of the photosensitive drum 1 is performed in a state in which the driving torque of the photosensitive drum 1 is increased by the torque increasing operation to a driving torque at which the deposited matter (aggregate) due to the toner on the photosensitive drum 1 can be removed. By this, even in the case where a state in which the driving torque of the photosensitive drum 1 becomes low is formed during the continuous image formation in which the high-area ratio images are continuously formed, the deposited matter (aggregate) due to the toner on the photosensitive drum 1 is removed, so that it becomes possible to suppress the occurrence of the image defect such as the toner fusion.

Embodiment 2

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

1. Outline of this Embodiment

It is known that with an increasing amount of the external additive present on the photosensitive drum 1, there is a tendency that the driving torque of the photosensitive drum 1 lowers. As one of factors in which the amount of the external additive becomes large, it is possible to cite that images with a high image area ratio (high-area ratio images) are continuously formed. This is because when the high-area ratio images are continuously formed, the amount of the external additive supplied together with the toner to the photosensitive drum 1 is increased. It turns out that when the amount of the external additive on the photosensitive drum 1 is increased, the toner fusion is also liable to occur since probability that the amount of the deposited matter (aggregate) due to the toner on the photosensitive drum 1 increases.

Therefore, in this embodiment, the image forming apparatus 100 carries out control of the toner fusion suppressing operation (specifically, a change in torque increasing operation start threshold) on the basis of the image area ratio.

2. Control Mode

Figure 7:
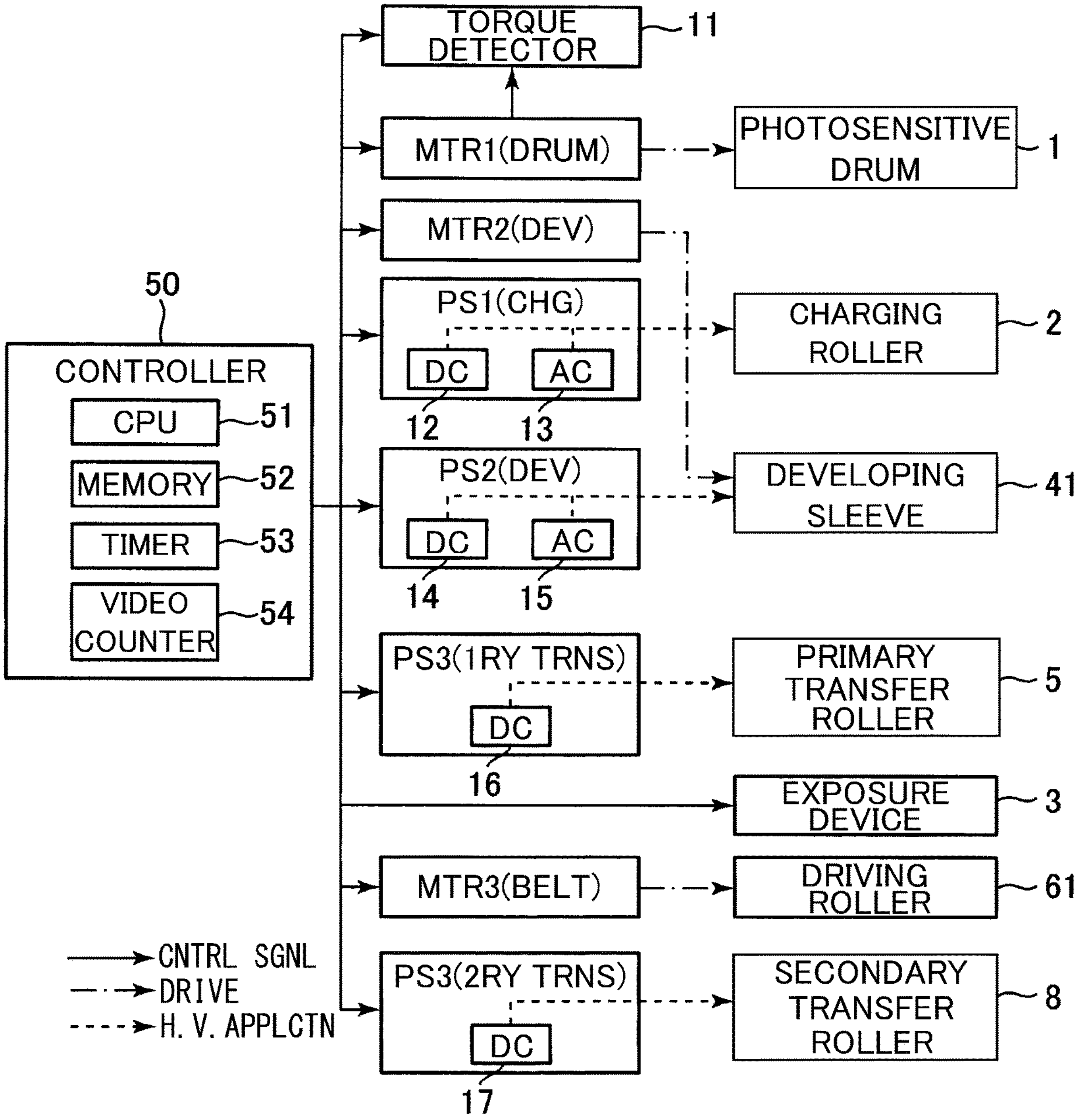
FIG. 7 is a schematic block diagram showing a control mode of an image forming apparatus in an embodiment 2.

FIG. 7 is a schematic block diagram showing a control mode of a principal part of the image forming apparatus 100 in this embodiment. The control mode in this embodiment shown in FIG. 7 is similar to the control mode in the embodiment 1 shown in FIG. 3. However, in FIG. 7, for explanation of this embodiment, the controller 50 further includes a video count portion 54 as an image information integrating means. The controller 50 sends a control signal corresponding to the image signal to the exposure device 3. The exposure device 3 outputs the laser light L modulated depending on the signal. Simultaneously with or before the sending of the image signal to the exposure device 3 by the controller 50, in the memory portion 52 of the controller 50, data of an image to be formed is written (stored). Then, as regards the image to be formed, for each of the toner images of the respective colors, the number of image signals is counted by the video count portion 54. A video count value counted by the video count portion 54 is written and stored in the memory portion 52.

3. Video Count Value

Figure 8:
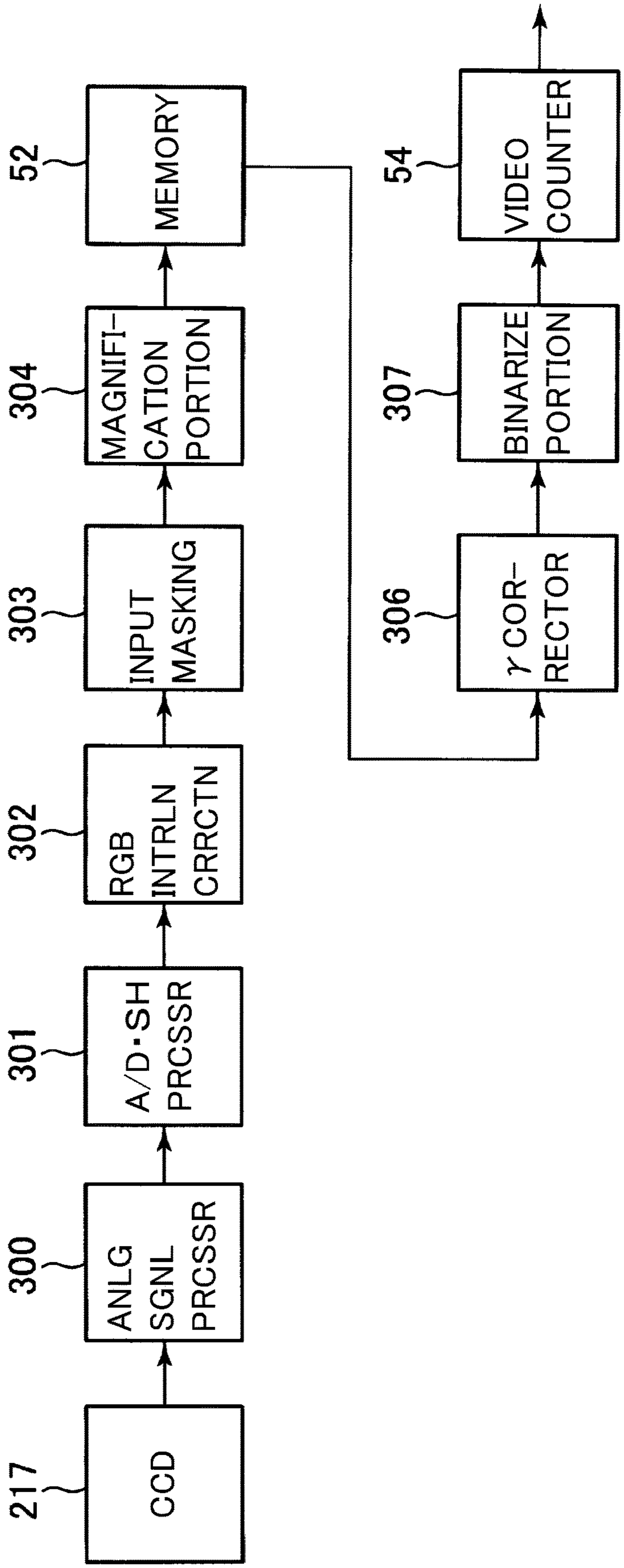
FIG. 8 is a schematic block diagram showing a constitution relating to image processing of a controller.

Next, the video count value will be further described. FIG. 8 is a block diagram specifically showing an inner constitution relating to image processing of the controller 50 in this embodiment. In this embodiment, the case where the image forming apparatus 100 forms the image on the basis of the image information read by an image reading device (not shown) will be described as an example, but the image forming apparatus 100 is also capable of forming the image on the basis of image information from a personal computer or the like.

The image formed by a CCD sensor 217 of the image reading device is converted to an analog electric signal by the CCD sensor 217. The converted image information is inputted to an analog signal processing portion 300 and is subjected to sampling & holding and correction of a dark level. Thereafter, in an A/D·SH processing portion 301, the resultant image information is subjected to analog/digital (A/D) conversion, and then the digitized signal is subjected to shading correction. In the shading correction, correction of a variation for each of pixels of the CCD sensor 217 and correction of a variation for a light quantity depending on a position based on a light distribution characteristic of an original to illumination lamp are made.

Thereafter, in an RGB interline correcting portion 302, RB interline correction is made. At a certain time, light beams inputted to light receiving portions for RGB of the CCD sensor 217 are deviated from each other on an original depending on a positional relationship between the respective light is receiving portions for RGB, and therefore, synchronization between RGB signals is achieved in this step.

Thereafter, in an input masking portion 303, input masking processing is performed, so that conversion from brightness data to density data is made. RGB values remaining outputted from the CCD sensor 217 are influenced by a color filter attached to the CCD sensor 217, and therefore, the influence is corrected, so that the RGB values are converted to pure RGB values.

Thereafter, the image is subjected to magnification processing with a desired variable magnification in a (variable) magnification portion 304, and then the magnified image data is sent to and accumulated in the memory portion 52.

The accumulated image is sent from the memory portion 52 to a γ-correction portion 306. In the γ-correction portion 306, in order to realize output depending on a set density value, on the basis of a look-up table (LUT) obtained by taking a printer characteristic into consideration, original density data is converted to density data corresponding to a desired output density. Then, the density data is sent to a binarizing portion 307. In the binarizing portion 307, an 8-bit multi-value signal is converted to a binary (two-level) signal. For example, as this converting method, dithering, an error diffusion method, an improved error diffusion method, and the like are used. The binarized data is sent to the video count portion 54, so that counting of the binarized data is conducted for each of the respective color images.

4. Toner Fusion Suppressing Operation

Figure 9:
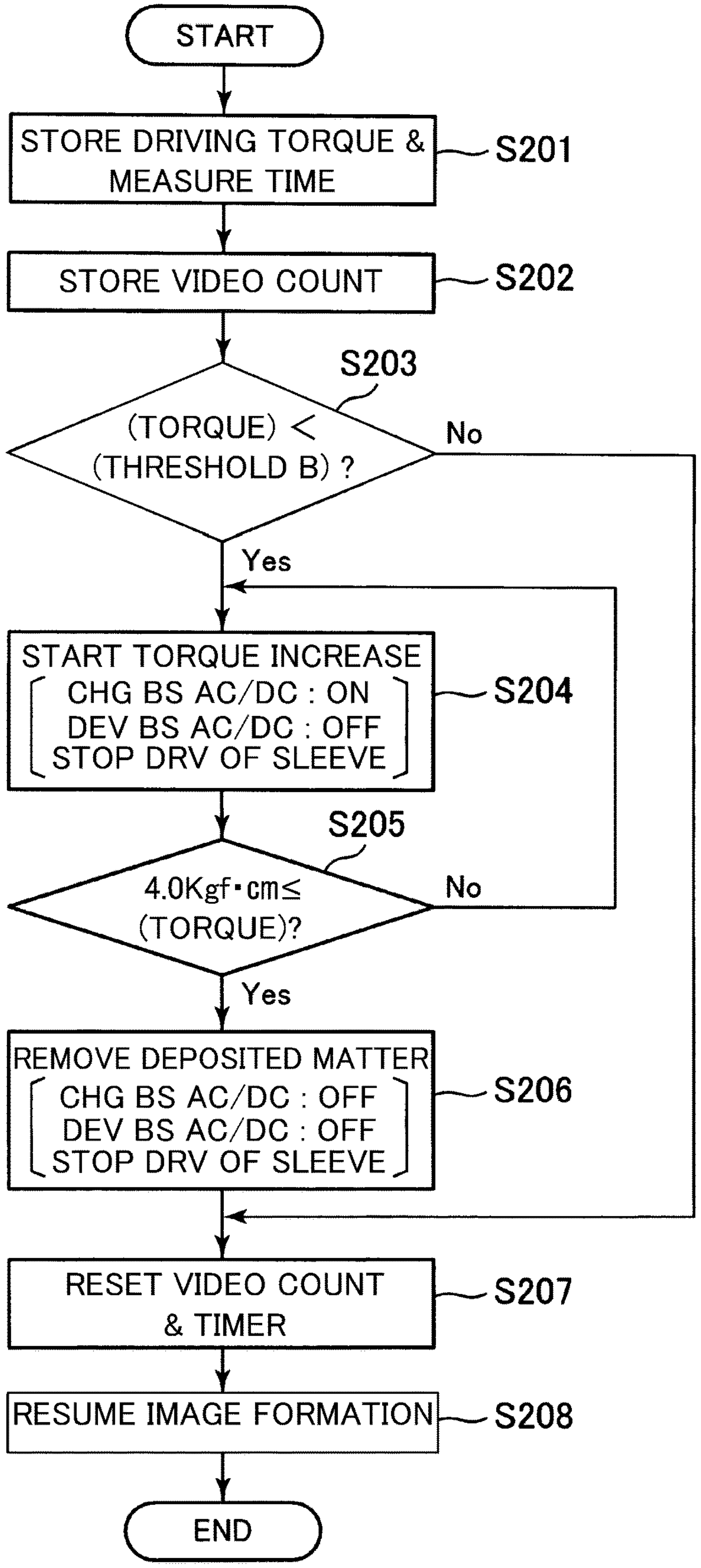
FIG. 9 is a flowchart of a toner fusion suppressing operation in the embodiment 2.

FIG. 9 is a flowchart showing an outline of procedure of the toner fusion suppressing operation in this embodiment. Incidentally, in this embodiment, similarly as in the embodiment 1, description will be made by paying attention to control of the toner fusion suppressing operation in one image forming portion S as a representative of the plurality of image forming portions S.

When a job (continuous image forming job in this embodiment) is started, during execution of an operation of the job (during rotation of the photosensitive drum 1), the controller 50 causes the memory portion 52 to store the driving torque acquired by the torque detecting circuit 11 (S201). A driving torque acquiring method in this embodiment is similar to the driving torque acquiring method in the embodiment 1. Further, in S201, the controller 50 starts measurement of a time by a timer 53.

Further, when the job is started, the controller 50 causes the memory portion 52 to store a cumulative video count value during the image formation (S202). In this embodiment, an image area ratio A is calculated from the cumulative video count value at a point of time after a lapse of 500 sec and the number of sheets subjected to the image formation. A table 1 shows a matrix showing a relationship between an image area ratio A and a torque increasing operation start threshold (start threshold) B in this embodiment. This information on the matrix is stored in the memory portion 52 in advance.

TABLE 1

| IAR*1 A (%) | TIOST*2 B (kgf · cm) |
|---|---|
| 0 ≤ A < 10 | 1.5 |
| 10 ≤ A < 20 | 2 |
| 20 ≤ A | 3 |

*1"IAR" is the image area ratio.
*2"TIOST" is the torque increasing operation start threshold.

In this embodiment, similarly as in the embodiment 1, at the time of the lapse of 500 sec, the controller 50 discriminates whether or not the driving torque is less than the start threshold five times or more of the ten times in which the driving torque is stored in the memory portion 52 (S203). When the discrimination is made, the controller 50 makes reference to the image area ratio A at that point of time, and determines the start threshold B in accordance with the matrix of the table 1. In this embodiment, similarly as in the embodiment 1, the controller 50 discriminates that the driving torque became smaller than the start threshold in the case where the average of the driving torques acquired with time during the execution of the job operation satisfies a predetermined condition (less than the start threshold five times or more of the ten times).

In the case where the controller 50 discriminated in S203 that the driving torque became less than the start threshold B ("Yes"), the controller 50 interrupts the image formation and executes the torque increasing operation in the sheet interval step (S204). This is because in this case, discrimination can be made that the controller 50 is capable of discriminating that removing power of the deposited matter (aggregate) due to the toner on the photosensitive drum 1 by the cleaning blade 71 is insufficient. Thereafter, the controller 50 acquires a driving torque detection result by the torque detecting circuit 11 during the torque increasing operation and discriminates whether or not the driving torque becomes not less than 4.0 kgf·cm as a torque increasing operation end threshold (end threshold) (S205). Then, in the case where the controller 50 discriminated in S205 that the driving torque became 4.0 kgf·cm (end threshold) or more ("Yes"), the controller 50 executes the deposited matter removing operation (S206). The controller 50 ends the deposited matter removing operation when it executes the deposited matter removing operation for a predetermined time, and the controller 50 resets each of the cumulative video count value and the timer 53 to an initial value (0 in this embodiment) (S207), and then restores the sequence to the image formation (S208).

On the other hand, in the case where the controller 50 discriminated in S203 that the driving torque is not less than the start threshold B, i.e., is the start threshold B or more ("No"), the following operation is performed. That is, without executing the toner fusion suppressing operation (the torque increasing operation and the deposited matter removing operation), the controller 50 resets each of the cumulative video count value and the timer 53 to the initial value (0 in this embodiment) (S207), and then continues the image formation (S208). This is because in this case, the controller 50 can discriminate that the deposited matter (aggregate) due to the toner on the photosensitive drum 1 is removed by the cleaning blade 71.

In this embodiment, it turns out that when the image area ratio A is less than 10%, the deposited matter (aggregate) due to the toner does not grow. For that reason, in this embodiment, the start threshold B in the case where the image area ratio A is less than 10% was set at the driving torque of 1.5 kgf·cm (table 1) equal to the driving torque of the photosensitive drum 1 when the start threshold B is smallest in the constitution of this embodiment. By this, in the case where the image area ratio A is less than 10%, setting such that the toner fusion suppressing operation (the torque increasing operation and the deposited matter removing operation) is not substantially executed was employed.

Incidentally, in this embodiment, the execution or non-execution of the toner fusion suppressing operation was controlled substantially depending on the image area ratio A by changing the start threshold B depending on the image area ratio A. In this embodiment, when the image area ratio A includes a first value and a second value smaller than the first value, the start threshold B in the case where the image area ratio A is the second value is made a value smaller than the start threshold B in the case where the image area ratio A is the first value, and the toner fusion suppressing operation was not executed in the case where the image area ratio A is less than the second value. However, the present invention is not limited to such a constitution, but the execution or non-execution of the toner fusion suppressing operation may be controlled more directly depending on the image area ratio A. For example, the toner fusion suppressing operation may be executed in the case where the image area ratio A is a predetermined value or more, and the toner fusion suppressing operation does not have to be executed in the case where the image area ratio A is less than the predetermined value.

5. Effect

As described above, in this embodiment, the counting portion 54 for integrating (counting) the signal value of the image information for defining the toner image is provided, and the controller 50 controls the execution or non-execution of the torque increasing operation on the basis of the cumulative value of the signal value integrated by the counting portion 54 in the predetermined period.

Further, according to this embodiment, not only an effect similar to the effect of the embodiment 1 is obtained, but also for a user who prints the image with a low image area ratio, it is possible to suppress the occurrence of the downtime due to the toner fusion suppressing operation.

Embodiment 3

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

1. Outline of this Embodiment

In this embodiment, information on a contact pressure (linear pressure) of the cleaning blade 71 to the photosensitive drum 1 (hereinafter, simply referred to as "contact pressure information") is stored in the memory portion 52. This contact pressure information is measured during manufacture of the image forming apparatus 100 or an exchanging unit including the cleaning blade 71 (or during factory shipping), and is inputted to the controller 50 by appropriate means and then is stored in the memory portion 52 as described later.

By auxiliarily utilizing this contact pressure information as a factor for discriminating the execution or non-execution of the toner fusion suppressing operation, control accuracy can be improved. By this, for example, even in the case where detection accuracy of the driving torque of the photosensitive drum 1 is low or in the like case, the occurrence of the downtime can be suppressed by suppressing the execution of an unnecessary toner fusion suppressing operation.

2. Control Mode

Figure 10:
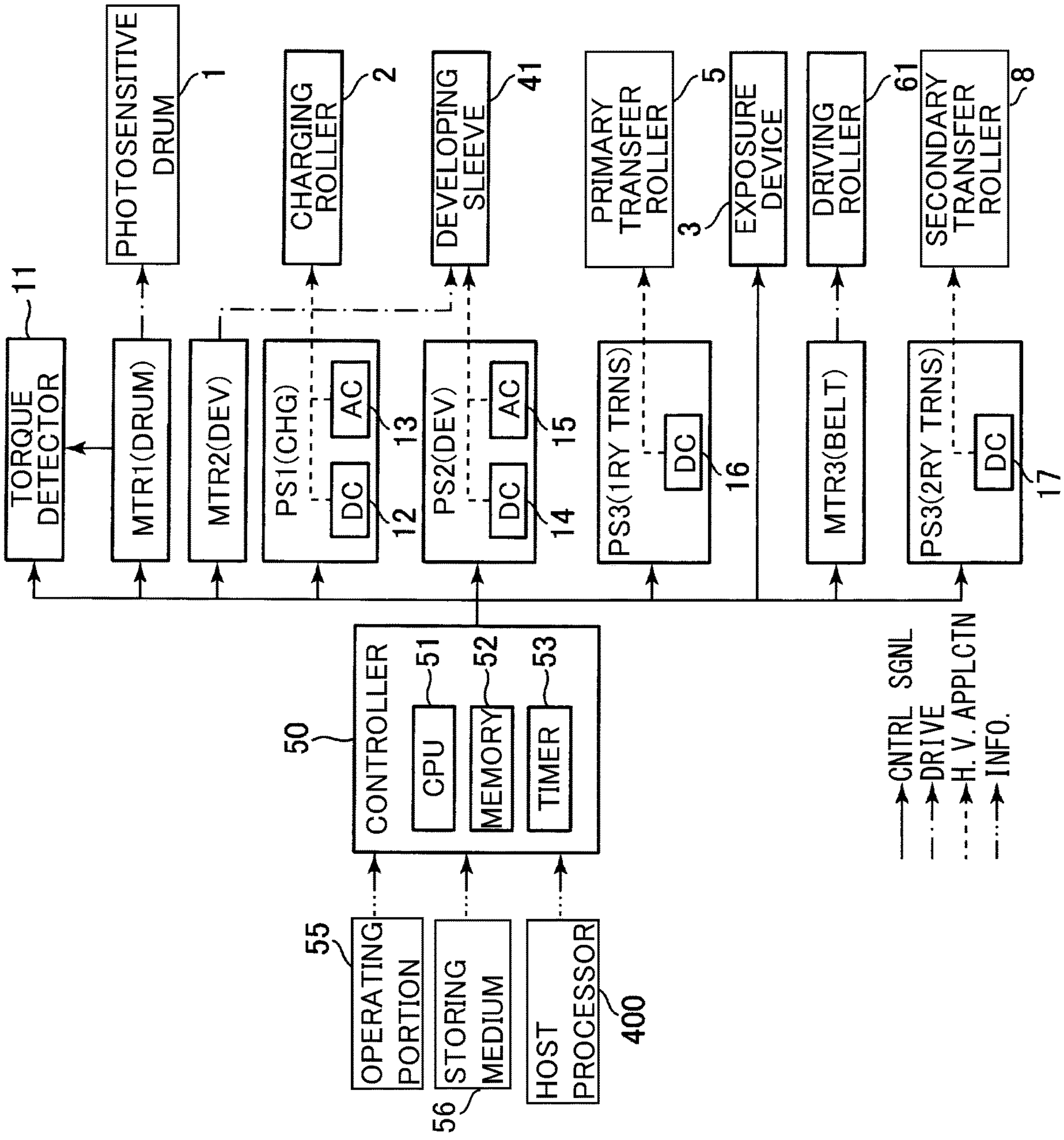
FIG. 10 is a schematic block diagram showing a control mode of an image forming apparatus in an embodiment 3.

FIG. 10 is a schematic block diagram showing a control mode of a principal part of the image forming apparatus 100 in this embodiment. The control mode in this embodiment shown in FIG. 10 is similar to the control mode in the embodiment 1 shown in FIG. 3. However, in FIG. 10, in order to explain this embodiment, the controller 50 is further connected to an operating portion 55 provided on the image forming apparatus 100, a storing medium 56 provided in the exchanging unit containing the cleaning blade 71, and an external host processing device 400.

The operating portion 55 may be constituted by including a display or a touch panel as a display means (display portion) for displaying information by control of the controller 50, and keys or a touch panel as an inputting means (inputting portion) for inputting information to the controller 50, and the like. Further, as the storing medium 56, an electronic memory such as a memory tag is suitably used and may be provided to a process cartridge or the like as the exchanging unit containing the cleaning blade 71. The process cartridge is a cartridge prepared by integrally assembling the photosensitive drum 1 and, as process means actable on the photosensitive drum 1, at least one of the charging roller 2, the developing device 4, and the cleaning device 7 and made detachably mountable to the apparatus main assembly of the image forming apparatus 100. The cleaning device 7 may be substantially singly made detachably mountable to the apparatus main assembly of the image forming apparatus 100.

In this embodiment, the contact pressure information is measured during manufacture of the image forming apparatus 100 or the exchanging unit containing the cleaning blade 71 (or during factory shipping). Then, this contact pressure information is inputted to the controller 50 through the operating portion 55 or the host processing device 400, and then is stored in the memory portion 52 or the storing medium 56 provided in the exchanging unit. In the case where the contact pressure information is inputted to the controller 50 through the operating portion 55 or the host processing device 400, the input is not limited to the input during the above-described manufacture (or during the above-described factory shipping). For example, an operator such as the user or a service person may input the contact pressure information provided by being packed together with a product, during installation of the image forming apparatus 100 or during exchange of the exchanging unit. Further, in the case where the contact pressure information is stored in the storing medium 56 of the exchanging unit, when the exchanging unit is mounted in the apparatus main assembly of the image forming apparatus 100, the controller 50 causes a reading portion (not shown) provided in the image forming apparatus 100 to read the contact pressure from the storing medium 56. Then, the controller 50 causes the memory portion 52 to store the read contact pressure information. Incidentally, the controller 50 may use the contact pressure information, read from the memory portion 52, in control without causing the memory portion 52 to store the read contact pressure information. Further, in this embodiment, the plurality of means were described, but the controller 50 may only be required to acquire the contact pressure information through at least one means including, for example, the operating portion 55, the storing medium 56, the host processing device 400, and the like which are described above.

3. Toner Fusion Suppressing Operation

Figure 11:
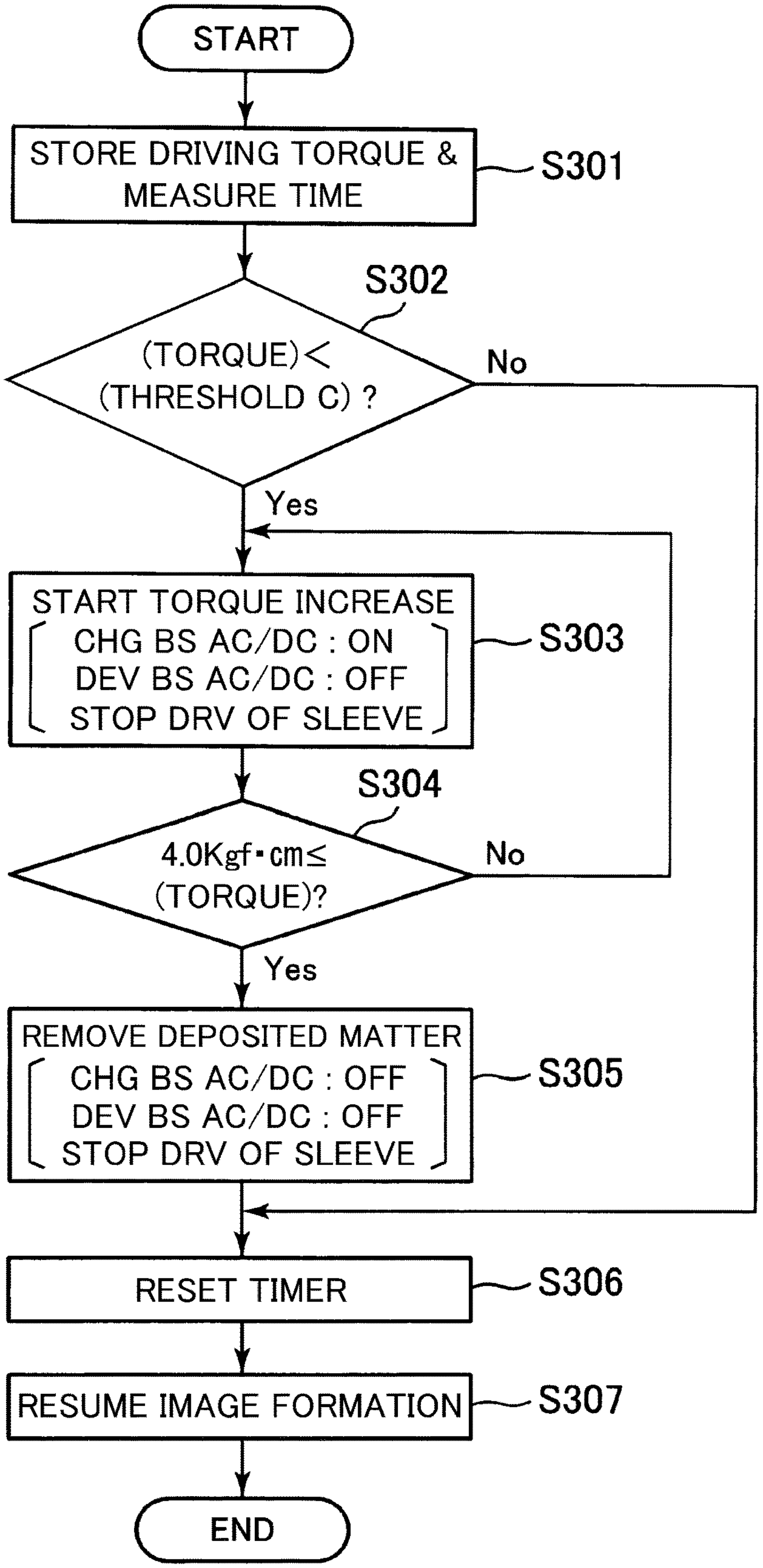
FIG. 11 is a flowchart of a toner fusion suppressing operation in the embodiment 3.

FIG. 11 is a flowchart showing an outline of procedure of the toner fusion suppressing operation in this embodiment. Incidentally, in this embodiment, similarly as in the embodiment 1, description will be made by paying attention to control of the toner fusion suppressing operation in one image forming portion S as a representative of the plurality of image forming portions S.

When a job (continuous image forming job in this embodiment) is started, during execution of an operation of the job (during rotation of the photosensitive drum 1), the controller 50 causes the memory portion 52 to store the driving torque acquired by the torque detecting circuit 11 (S301). A driving torque acquiring method in this embodiment is similar to the driving torque acquiring method in the embodiment 1. Further, in S301, the controller 50 starts measurement of a time by a timer 53.

A table 2 shows a matrix showing a relationship between contact pressure (linear pressure) A of the cleaning blade 71 to the photosensitive drum 1 and a torque increasing operation start threshold (start threshold) C in this embodiment. This information on the matrix is stored in the memory portion 52 in advance.

TABLE 2

| CBCP*[1] A (gf/cm) | TIOST*[2] C (kgf · cm) |
|---|---|
| 32.5 ≤ A < 35 10 | 1.5 |
| 30 ≤ A < 32.5 | 2 |
| 27.5 ≤ A < 30 | 2.5 |
| 25 ≤ A < 27.5 | 3 |

*[1]"CBCP" is the cleaning blade contact pressure (linear pressure).
*[2]"TIOST" is the torque increasing operation start threshold.

In this embodiment, similarly as in the embodiment 1, at the time of the lapse of 500 sec, the controller 50 discriminates whether or not the driving torque is less than the start threshold five times or more of the ten times in which the driving torque is stored in the memory portion 52 (S302). When the discrimination is made, the controller 50 makes reference to the contact pressure information (linear pressure) stored in the memory portion 52 (or the storing medium 56), and determines the start threshold C in accordance with the matrix of the table 2. In this embodiment, similarly as in the embodiment 1, the controller 50 discriminates that the driving torque became smaller than the start threshold in the case where the average of the driving torques acquired with time during the execution of the job operation satisfies a predetermined condition (less than the start threshold five times or more of the ten times).

In the case where the controller 50 discriminated in S302 that the driving torque became less than the start threshold C ("Yes"), the controller 50 interrupts the image formation and executes the torque increasing operation in the sheet interval step (S303). This is because in this case, discrimination can be made that the controller 50 is capable of discriminating that removing power of the deposited matter (aggregate) due to the toner on the photosensitive drum 1 by the cleaning blade 71 is insufficient. Thereafter, the controller 50 acquires a driving torque detection result by the torque detecting circuit 11 during the torque increasing operation and discriminates whether or not the driving torque becomes not less than 4.0 kgf·cm as a torque increasing operation end threshold (end threshold) (S304). Then, in the case where the controller 50 discriminated in S304 that the driving torque became 4.0 kgf·cm (end threshold) or more ("Yes"), the controller 50 executes the deposited matter removing operation (S305). The controller 50 ends the deposited matter removing operation when it executes the deposited matter removing operation for a predetermined time, and the controller 50 resets the timer 53 to an initial value (0 in this embodiment) (S306), and then restores the sequence to the image formation (S307).

On the other hand, in the case where the controller 50 discriminated in S302 that the driving torque is not less than the start threshold C, i.e., is the start threshold C or more ("No"), the following operation is performed. That is, without executing the toner fusion suppressing operation (the torque increasing operation and the deposited matter removing operation), the controller 50 resets the timer 53 to the initial value (0 in this embodiment) (S306), and then continues the image formation (S307). This is because in this case, the controller 50 can discriminate that the deposited matter (aggregate) due to the toner on the photosensitive drum 1 is removed by the cleaning blade 71.

In this embodiment, it turns out that when the linear pressure is 32.5 gf/cm or more, a removing property of the deposited matter (aggregate) due to the toner is not sufficient. For that reason, in this embodiment, the start threshold C in the case where the linear pressure is 32.5 gf/cm or more was set at the driving torque of 1.5 kgf·cm (table 2) equal to the driving torque of the photosensitive drum 1 when the start threshold C is smallest in the constitution of this embodiment. By this, in the case where the linear pressure is 32.5 gf/cm or more, setting such that the toner fusion suppressing operation (the torque increasing operation and the deposited matter removing operation) is not substantially executed was employed.

Incidentally, in this embodiment, the execution or non-execution of the toner fusion suppressing operation was controlled substantially depending on the contact pressure (linear pressure) of the cleaning blade 71 to the photosensitive drum 1 by changing the start threshold C depending on the contact pressure (linear pressure). In this embodiment, when the contact pressure (linear pressure) includes a first value and a second value larger than the first value, the start threshold C in the case where the contact pressure (linear pressure) is the second value is made a value smaller than the start threshold C in the case where the contact pressure (linear pressure) is the first value, and the toner fusion suppressing operation was not executed in the case where the image area ratio A is the second value or more. However, the present invention is not limited to such a constitution, but the execution or non-execution of the toner fusion suppressing operation may be controlled more directly depending on the contact pressure (linear pressure). For example, the toner fusion suppressing operation may be executed in the case where the contact pressure (linear pressure) is less than a predetermined value, and the toner fusion suppressing operation does not have to be executed in the case where the contact pressure (linear pressure) is the predetermined value or more.

4. Effect

As described above, in this embodiment, the image forming apparatus 100 includes the storing portion 52 for storing the contact pressure information on the contact pressure of the cleaning member 71 to the photosensitive drum 1, and the controller 50 controls the execution or non-execution of the torque increasing operation on the basis of the contact pressure information stored in the storing portion 52.

Further, according to this embodiment, not only an effect similar to the effect of the embodiment 1 is obtained, but also for example, even in the case where detection accuracy of the driving torque of the photosensitive drum 1 is low, it is possible to suppress execution of an unnecessary toner fusion suppressing operation by auxiliary use of the contact pressure information. By this, it becomes possible to suppress the occurrence of the downtime.

Incidentally, the control based on the image area ratio described in the embodiment 2 and the control based on the contact pressure information described in this embodiment may be combined with each other.

Embodiment 4

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

In the embodiments 1 to 3, for simplification, description was made by paying attention to the control of the toner fusion suppressing operation in one image forming portion S as a representative of the plurality of image forming portions. In this embodiment, an example of control of the toner fusion suppressing operation in the plurality of image forming portions S will be described.

In the case where the image forming apparatus 100 includes the plurality of image forming portions S, the driving torques of the photosensitive drum 1 in the image forming portions are different from each other depending on the image forming condition, a condition such as the contact pressure information, or the like in some instances. Therefore, in the case where the image forming apparatus 100 includes the plurality of image forming portions S, it is preferable that discrimination of the execution or non-execution of the toner fusion suppressing operation (threshold discrimination) is made individually for the respective image forming portions S. In this embodiment, in the case where the driving torque of the photosensitive drum 1 becomes less than the start threshold in at least one of the plurality of image forming portions S, the toner fusion suppressing operation (the torque increasing operation and the deposited matter removing operation) is executed at least in the image forming portion S.

Figure 12:
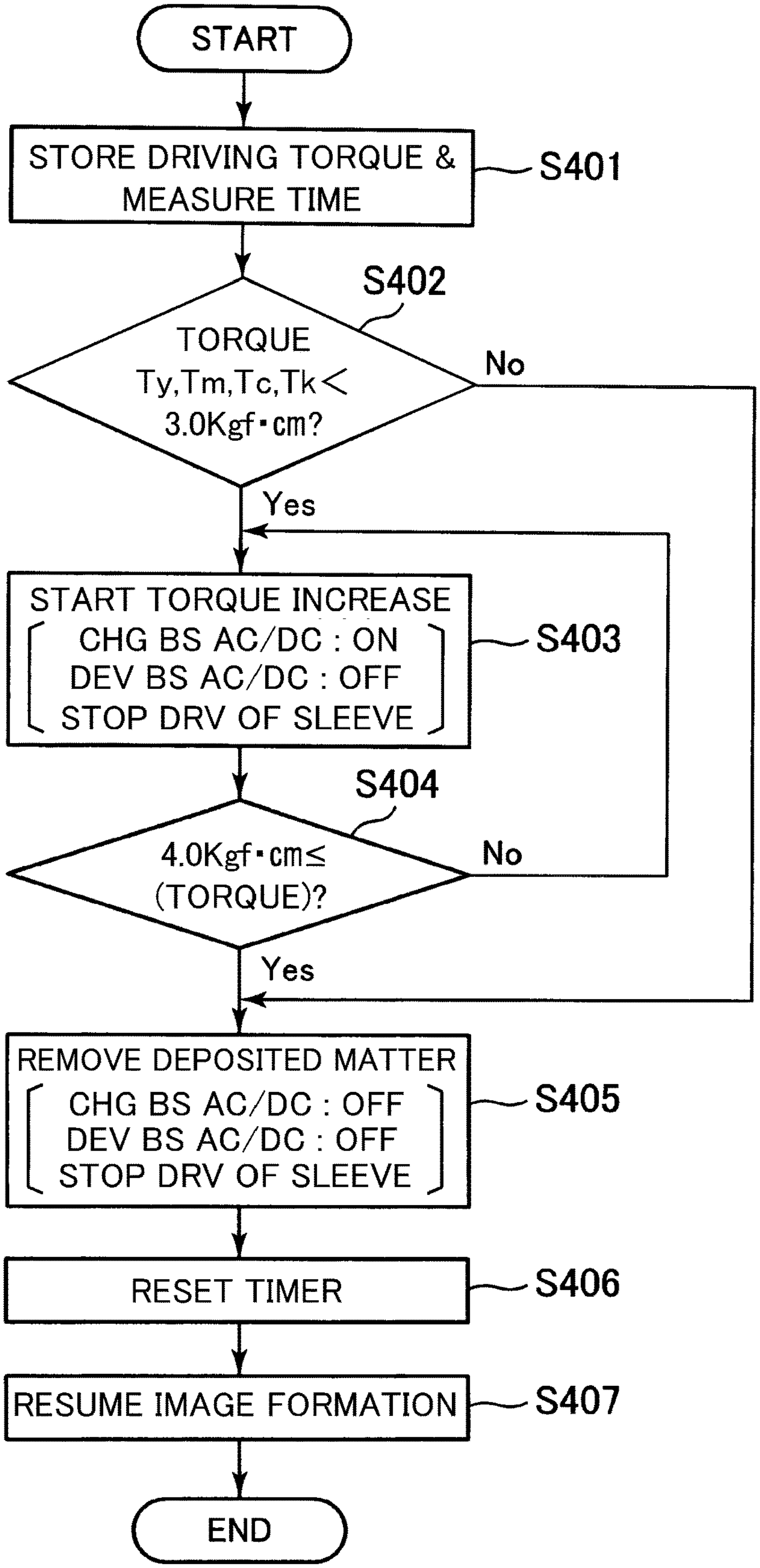
FIG. 12 is a flowchart of a toner fusion suppressing operation in an embodiment 4.

FIG. 12 is a flowchart showing an outline of procedure of the toner fusion suppressing operation in this embodiment.

When a job (continuous image forming job in this embodiment) is started, during execution of an operation of the job (during rotation of each of the photosensitive drums 1, the controller 50 causes the memory portion 52 to store driving torques Ty, Tm, Tc, and Tk, individually acquired in the respective image forming portions S (S401). A driving torque acquiring method in the respective image forming portions S in this embodiment is similar to the driving torque acquiring method in the embodiment 1. Further, in S401, the controller 50 starts measurement of a time by a timer 53.

In this embodiment, the controller 50 makes comparison between the driving torque and the start threshold at the time of the lapse of 500 sec similarly as in the embodiment 1 individually for each of the image forming portions S. That is, for each image forming portion S, the controller 50 discriminates whether or not the driving torque is less than 3.0 kgf·cm (torque increasing operation start threshold) five times or more of the ten times in which the driving torque is stored in the memory portion 52 (S402). That is, in this embodiment, similarly as in the embodiment 1, the controller 50 discriminates individually for each image forming portion S that the driving torque became smaller than the start threshold in the case where the average of the driving torques is less than the start threshold five times or more of the ten times.

As regards the image forming portion S in which the controller 50 discriminated in S402 that the driving torque became less than 3.0 kgf·cm ("Yes"), the controller 50 interrupts the image formation and executes the torque increasing operation in the sheet interval step (S403). This is because as regards the image forming portion S, discrimination can be made that the controller 50 is capable of discriminating that removing power of the deposited matter (aggregate) due to the toner on the photosensitive drum 1 by the cleaning blade 71 is insufficient. Thereafter, as regards the image forming portion S, the controller 50 acquires a driving torque detection result by the torque detecting circuit 11 during the torque increasing operation and discriminates whether or not the driving torque becomes not less than 4.0 kgf·cm as a torque increasing operation end threshold (end threshold) (S404). Then, as regards the image forming portion S in which the controller 50 discriminated in S404 that the driving torque became 4.0 kgf·cm (end threshold) or more ("Yes"), the controller 50 executes the deposited matter removing operation (S405).

On the other hand, as regards the image forming portion S in which the controller 50 discharged in S402 that the driving torque is not less than 3.0 kgf·cm, i.e., is 3.0 kgf·cm or more ("No"), the deposited matter removing operation is performed in this embodiment (S405). That is, as regards the image forming portion S, the removing property of the deposited matter (aggregate) due to the toner on the photosensitive drum 1 by the cleaning blade 71 is sufficient, and therefore, the deposited matter removing operation is executed by omitting the torque increasing operation.

Then, in this embodiment, the controller 50 ends the toner fusion suppressing operation (the torque increasing operation or the deposited matter removing operation) after a lapse of a predetermined time from a start of the toner fusion suppressing operation, and resets the timer 53 to an initial value (0 in this embodiment) (S406), and then all the image forming portions S are restored to the image formation (S407). Incidentally, in this embodiment, as described in the embodiment 1, in the case where the driving torque of the photosensitive drum 1 does not reach the end threshold in the image forming portion S in which the torque increasing operation is executed, the image forming portions S are restored to the image formation. In this embodiment, the above-described predetermined time (upper limit of the entire execution time of the toner fusion suppressing operation) was set at 60 sec.

Figure 13:
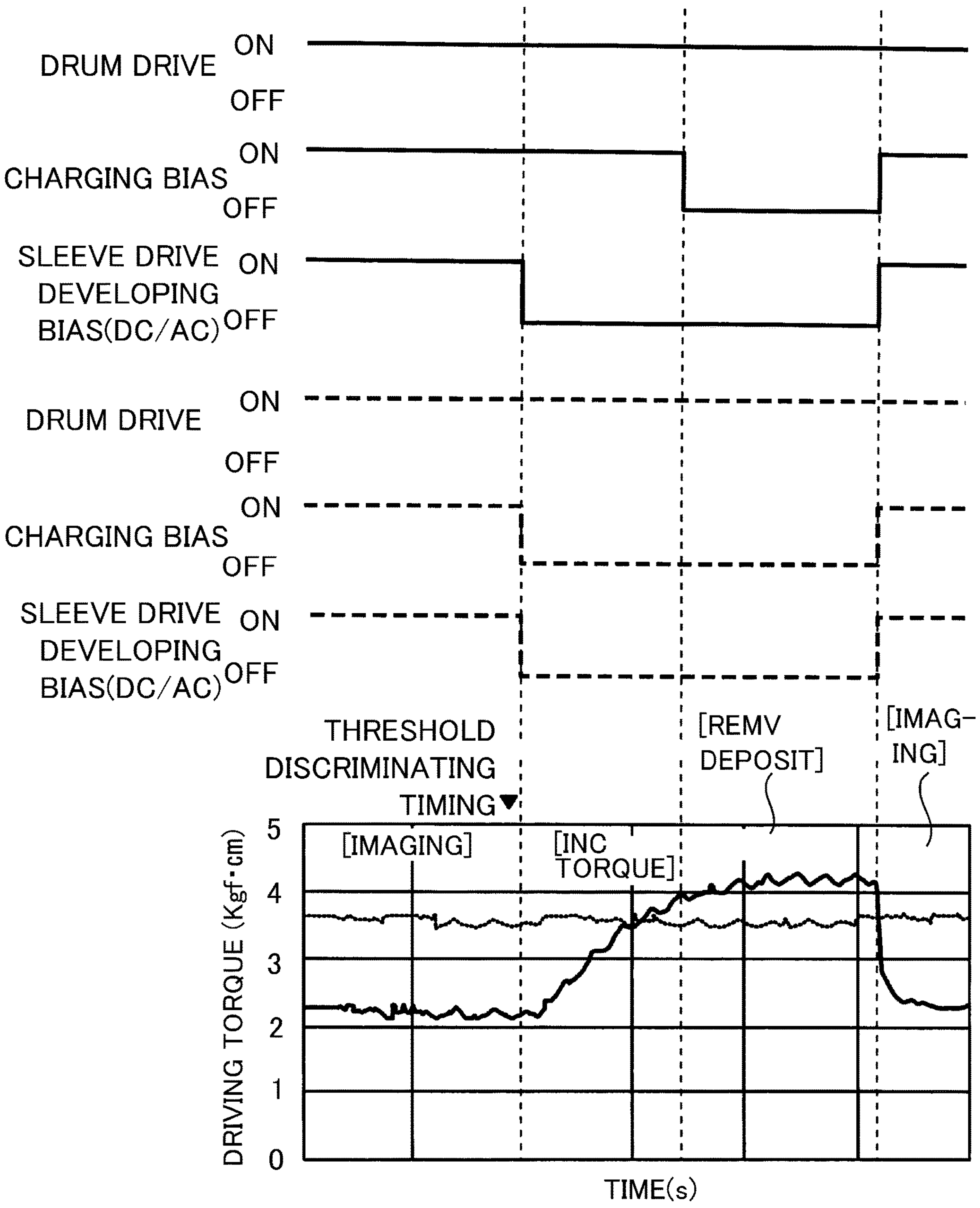
FIG. 13 includes a sequence chart of the toner fusion suppressing operation and progression of a driving torque of a photosensitive drum in the embodiment 4.

FIG. 13 is an illustration showing an example of a relationship between the toner fusion suppressing operation and progression of the driving torque of the photosensitive drum 1 in this embodiment. An upper stage of FIG. 13 shows a sequence diagram of the drive of the photosensitive drum 1 and the developing sleeve 41 and application of the charging bias and the developing bias in the toner fusion suppressing operation. In the sequence diagram, the image forming portion S (solid line) in which the driving torque is less than the start threshold at the time of the discrimination of S402 in FIG. 12 and the image forming portion S (broken line) in which the driving torque is the start threshold or more at the same time are shown. Further, a lower stage of FIG. 13 is a graph showing progression of the driving torque of the photosensitive drum 1 in a period corresponding to the period in the sequence diagram in the upper stage. In the graph, the image forming portion S (solid line) in which the driving torque is less than the start threshold at the time of the discrimination of S402 in FIG. 12 and the image forming portion S (dotted line) in which the driving torque is the start threshold or more at the same time are shown.

In FIG. 13, in the image forming portion S in which the driving torque of the photosensitive drum 1 during the image formation is in a state indicated by the dotted line, the driving torque is the start threshold or more at the time of the discrimination of S402 in FIG. 12, and therefore, the torque increasing operation is not executed. In such an image forming portion S in which the torque increasing operation is not executed, the sequence is shifted to an operation similar to the deposited matter removing operation. On the other hand, in FIG. 13, in the image forming portion S in which the driving torque of the photosensitive drum 1 during the image formation is in a state indicated by the solid line, the driving torque is less than the start threshold at the time of the discrimination of S402 in FIG. 12, and therefore, the torque increasing operation is executed. In the image forming portion S in which the torque increasing operation is executed, in the case where the driving torque of the photosensitive drum 1 becomes 4.0 kgf·cm or more, the sequence is shifted to the deposited matter removing operation. Then, after the deposited matter removing operation is executed until the predetermined time has elapsed as described above, all the image forming portions S resume the image formation.

Incidentally, in this embodiment, in the case where the torque increasing operation is executed in a certain image forming portion S, the deposited matter removing operation is executed in the image forming portions in which the torque increasing operation is not executed, but the present invention is not limited to such a constitution. In the image forming portions S in which the torque increasing operation is not executed, as needed, the image formation can be continued.

As described above, in this embodiment, the image forming apparatus 100 includes the controller 50 capable of executing the operation (torque increasing operation) in which during execution of the continuous image formation in which the image formation for transferring the toner image onto the recording material P is continuously carried out for transferring the toner images onto the plurality of recording materials P, in at least one image forming portion S of the plurality of image forming portions S, the image formation is interrupted and the voltage causing the electric discharge between the charging member 2 and the photosensitive drum 1 is applied to the charging member 2, and the photosensitive drum 1 is rotated through at least one-full circumference in the state in which rotation of the developing member 41 is stopped or the developing member 41 is rotated at a rotational speed slower than the rotational speed during the image formation. Further, during the above-described continuous image formation, the controller 50 discriminates at a predetermined timing whether or not the detection result of the detecting portion 11 acquired with the time shows that the driving torque of the photosensitive drum 1 by the driving motor MTR1 lowers so as to satisfy the predetermined condition. In the case where the controller 50 discriminated that the detection result shows that the state lowers in at least one image forming portion S of the plurality of image forming portions S, the controller 50 executes the above-described operation (torque increasing operation) in at least one image forming portion S described above. Further, in this embodiment, in the image forming portion S, of the plurality of image forming portions S, in which the controller 50 discriminated at the predetermined timing that the detection result does not show that the driving torque lowers, the controller 50 executes another operation (deposited matter removing operation) in which the image formation is carried out or in which the image formation is interrupted, and the voltage is not applied to the charging member 2 or the voltage not causing the electric discharge between the charging member 2 and the photosensitive drum 1 is applied to the charging member 2, and the photosensitive member 1 is rotated through at least one-full circumference in the state in which rotation of the developing member 41 is stopped or the developing member 41 is rotated at a rotational speed slower than the rotational speed during the image formation.

Thus, in this embodiment, on the basis of the driving torque of the photosensitive drum 1 in the associated image forming portion S, an idling operation of the photosensitive drum 1 can be performed in a state in which the driving torque is increased to a driving torque at which the deposited matter (aggregate) can be removed individually for each of the image forming portions S. By this, in each of the image forming portions S, an effect similar to the effect of the embodiment 1 can be obtained.

Incidentally, in this embodiment, by control similar to the control described in the embodiment 1, the execution or non-execution of the toner fusion suppressing operation was discriminated individually in each of the image forming portions S, but may be discriminated by the control described in the embodiments 2 and 3.

OTHER EMBODIMENTS

The present invention was described based on the specific embodiments mentioned above, but is not limited to the above-mentioned embodiments.

In the above-described embodiments, the image forming apparatus employs the constitution in which as the charging bias, the oscillating voltage in the superimposed form of the DC component and the AC component is applied, but may also employ a constitution in which a charging bias consisting only of the DC component is applied.

Further, in the above-described embodiments, the image forming apparatus employs the constitution in which only the cleaning blade is provided as the cleaning member, but may also be employ a constitution in which as the cleaning member, for example, a rotatable brush (fur brush) is provided in addition to the cleaning blade. Incidentally, it can be said that the present invention is particularly effective in the case where the cleaning member for abrading (polishing) the surface of the photosensitive member with rotation of the photosensitive member by being disposed in contact with the surface of the photosensitive member is a blade-like (plate-like) member. This is because it can be said that in this case, the driving torque can be readily increased by the torque increasing operation and the deposited matter can be readily removed by the deposited matter removing operation. However, the present invention is not limited to such a constitution, but may employ another constitution in which the cleaning member for abrading (polishing) the surface of the photosensitive member is a sheet-like member or a pad-like (block-like) member or the like.

Further, in the above-described embodiments, the photosensitive member is the drum-like photosensitive member, but the present invention is not limited to such a constitution. The photosensitive member may also be constituted by an endless belt.

Further, in the above-described embodiments, the image forming apparatus employed the intermediary transfer type, but the present invention is not limited thereto. The image forming apparatus may also employ a direct transfer type. That is, there is a constitution in which a recording material carrying member for carrying and conveying the recording material is provided in place of the intermediary transfer member in the above-described embodiments. As the recording material carrying member, a recording material carrying belt constituted by an endless belt similar to the intermediary transfer belt used in the above-described embodiments, or the like is used. In this image forming apparatus, the toner images formed on the photosensitive members of the respective image forming portions are directly transferred onto the recording material carried and conveyed by the recording material carrying member. Even in the image forming apparatus employing such a constitution, by applying the present invention, an effect similar to the effects of the above-described embodiments can be obtained. Further, the image forming apparatus may also be a monochromatic image forming apparatus in which only a single image forming portion such as an image forming portion for black is provided and in which the toner image is directly transferred from the photosensitive member of this image forming portion onto the recording material.

Further, in the case where the execution or non-execution of the toner fusion suppressing operation is discharged on the basis of the image area ratio, or the like case, irrespective of the detection result of the driving torque, for example, the toner fusion suppressing operation may be executed at a predetermined timing such as every predetermined number of sheets subjected to image formation. For example, in the case where formation of a high-area ratio image with a predetermined image area ratio value is continued over a predetermined number of sheets subjected to the image formation, a predetermined toner fusion suppressing operation may be executed. That is, the image forming apparatus 100 may only be required to be capable of executing the operation (torque increasing operation) in which during execution of the continuous image formation in which the image formation for transferring the toner image onto the recording material P is continuously carried out for transferring the toner images onto the plurality of recording materials P, the image formation is interrupted and the voltage causing the electric discharge between the charging member 2 and the photosensitive drum 1 is applied to the charging member 2, and the photosensitive drum 1 is rotated through at least one-full circumference in the state in which rotation of the developing member 41 is stopped or the developing member 41 is rotated at a rotational speed slower than the rotational speed during the image formation. Further, after the above-described operation (torque increasing operation) and before the image formation is resumed, the image forming apparatus 100 may be capable of executing another operation in which the voltage is not applied to the charging member 2 or the voltage not causing the electric discharge between the charging member 2 and the photosensitive drum 1 is applied to the charging member 2, and the photosensitive member 1 is rotated through at least one-full circumference in the state in which rotation of the developing member 41 is stopped or the developing member 41 is rotated at a rotational speed slower than the rotational speed during the image formation. At this time, in the case where an average of the image area ratios of the toner images formed during the execution of the above-described continuous image formation is smaller than a predetermined value, it is possible to employ a constitution in which the image formation is interrupted and the above-described operation is not executed.

Further, in the above-described embodiments, the case where the image formation is interrupted during execution of the continuous image formation and then the toner fusion suppressing operation is executed in the sheet interval step was described, but a similar operation can be executed during another non-image formation step. For example, on the basis of the driving torque acquired during execution of a job for forming image(s) on a single recording material or a plurality of recording materials, the toner fusion suppressing operation can be executed in a post-rotation step after the image formation of the job is ended, or in a pre-rotation step or a pre-multi-rotation step before image formation of a subsequent job is carried out.

According to the present invention, it is possible to suppress the occurrence of the image defect such as the toner fusion caused by the lowering in abrading force of the surface of the photosensitive member by the cleaning member during the execution of the continuous image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132482 filed on Aug. 16, 2021, which is hereby incorporated by reference herein in its entirety.

What is claimed is:

1. An image forming apparatus comprising:

a rotatable photosensitive member;

a charging member configured to electrically charge said photosensitive member;

a developing device including a developer carrying member for carrying a developer and configured to develop a latent image formed on said photosensitive member;

a blade configured to clean said photosensitive member;

a detecting portion configured to detect information correlating with a driving torque of said photosensitive member; and a controller configured to execute, on the basis of a detection result of said detecting portion, a predetermined operation in which during execution of continuous image formation for continuously forming images on a plurality of recording materials, the image formation is interrupted and an interval between consecutive recording materials is increased, and then said photosensitive member is rotated, wherein said controller causes said photosensitive member to rotate through one full circumference or more on the following conditions during the predetermined operation:

(i) a voltage which is a discharge start voltage or higher is applied to said charging member, and (ii) an operation condition of said developing device is a first condition, and wherein in the first condition, an amount of fog toner deposited from said developer carrying member on said photosensitive member is less than an amount of the fog toner in a second condition which is an operation condition of said developing device during a sheet interval step before the image formation during the continuous image formation is interrupted.

2. An image forming apparatus according to claim 1, wherein when the operation condition of said developing device is the first condition, rotation of said developer carrying member stops.

3. An image forming apparatus according to claim 1, wherein when the operation condition of said developing device is the first condition, a voltage is not applied to said developer carrying member.

4. An image forming apparatus according to claim 1, wherein in a case that a detection result of said detecting portion acquired with time during execution of the continuous image formation satisfies a predetermined condition, said controller executes the predetermined operation.

5. An image forming apparatus according to claim 1, wherein in a case that the driving torque indicated by an average of a plurality of detection results of said detecting portion acquired during execution of the continuous image formation is lower than a predetermined threshold, said controller executes the predetermined operation.

6. An image forming apparatus according to claim 1, wherein the predetermined operation is a first predetermined operation, and said controller is capable of executing a second predetermined operation after the first predetermined operation and before the image formation is resumed, wherein said controller causes said photosensitive member to rotate on the following conditions during the second predetermined operation:

(i) to said charging member, a voltage is not applied or a voltage which is lower than the discharge start voltage is applied, and (ii) an operation condition of said developing device is a third condition, and wherein on the third condition, the amount of the fog toner deposited from said developer carrying member on said photosensitive member is less than an amount of the fog toner on the second condition.

7. An image forming apparatus according to claim 6, wherein said controller causes said photosensitive member to rotate through at least one full circumference during the second predetermined operation.

8. An image forming apparatus according to claim 6, wherein said controller switches the predetermined operation from the first predetermined operation to the second predetermined operation on the basis of the detection result of said detecting portion detected during the first predetermined operation.

9. An image forming apparatus according to claim 6, wherein said controller executes the first predetermined operation in a case that the driving torque indicated by an average of a plurality of detection results of said detecting portion acquired during execution of the continuous image formation is lower than a predetermined first threshold, and executes the second predetermined operation in a case that the driving torque indicated by an average of a plurality of detection results of said detecting portion acquired during execution of the first predetermined operation is a predetermined second threshold or higher.

10. An image forming apparatus according to claim 9, wherein the second threshold is higher than the first threshold.

11. An image forming apparatus according to claim 1, wherein in the predetermined operation, to said charging member, said controller applies an oscillating voltage in a superimposed form of a DC component and an AC component.

12. An image forming apparatus according to claim 11, wherein in the predetermined operation, to said charging member, said controller applies an oscillating voltage in a superimposed form of a DC component, having the same polarity as a polarity during image formation and an absolute value lower than an absolute value during the image formation, and an AC component.

13. An image forming apparatus comprising:

a rotatable photosensitive member;

a charging member configured to electrically charge said photosensitive member;

a developing device including a developer carrying member for carrying a developer and configured to develop a latent image formed on said photosensitive member;

a blade configured to clean said photosensitive member; and a controller configured to execute a predetermined operation in which during continuous image formation for continuously forming images on a plurality of recording materials, the image formation is interrupted and an interval between consecutive recording materials is increased, and then said photosensitive member is rotated, wherein during the predetermined operation, said controller executes a first predetermined operation and then executes a second predetermined operation, wherein in the first predetermined operation, said photosensitive member is rotated through one full circumference or more on the following conditions:

(i) a voltage which is a discharge start voltage or higher is applied to said charging member, and (ii) an operation condition of said developing device is a first condition, wherein on the first condition, an amount of fog toner deposited from said developer carrying member on said photosensitive member is less than an amount of the fog toner on a second condition which is an operation condition of said developing device during a sheet interval step before the image formation during the continuous image formation is interrupted, and wherein, in the second predetermined operation, said photosensitive member is rotated on the following conditions:

(i) to said charging member, a voltage is not applied or a voltage which is lower than the discharge start voltage is applied, and (ii) an operation condition of said developing device is a third condition, and wherein in the third condition, the amount of the fog toner deposited from said developer carrying member on said photosensitive member is less than an amount of the fog toner in the second condition.

14. An image forming apparatus according to claim 13, wherein when the operation condition of said developing device is the first condition, rotation of said developer carrying member stops.

15. An image forming apparatus according to claim 13, wherein when the operation condition of said developing device is the first condition, a voltage is not applied to said developer carrying member.

16. An image forming apparatus according to claim 13, wherein in the predetermined operation to said charging member, said controller applies an oscillating voltage in a superimposed form of a DC component and an AC component.

17. An image forming apparatus according to claim 16, wherein in the predetermined operation, to said charging member, said controller applies an oscillating voltage in a superimposed form of a DC component, having the same polarity as a polarity during image formation and an absolute value lower than an absolute value during the image formation, and an AC component.

18. An image forming apparatus comprising:

a plurality of image forming portions each including a rotatable photosensitive member, a charging member for electrically charging a surface of said photosensitive member, a charging power source for applying a voltage to said charging member, an exposure portion for forming an electrostatic image on the charged surface of said photosensitive member by exposing the charged surface of said photosensitive member to light, a rotatable developing member for forming a toner image on the surface of said photosensitive member by supplying toner to the electrostatic image, a cleaning member for removing the toner from the surface of said photosensitive member in contact with the surface of said photosensitive member, a driving portion for driving said photosensitive member, and a detecting portion for detecting a value correlating with a driving torque of said photosensitive member by said driving portion;

a transfer device configured to transfer the toner image formed on said photosensitive member of each of said plurality of image forming portions; and a controller capable of executing an operation, in at least one image forming portion of said plurality of image forming portions during continuous image formation in which image formation for forming the toner image transferred onto a recording material is continuously carried out for transferring the toner images onto a plurality of recording materials, wherein the image formation is interrupted and a voltage generating discharge between said charging member and said photosensitive member is applied to said charging member, and then said photosensitive member is rotated through at least one full circumference in a state in which rotation of said developing member is stopped or in a state in which said developing member is rotated at a rotational speed lower than a rotational speed during the image formation, wherein said controller discriminates, at a predetermined timing during the continuous image formation, whether or not a detection result of said detecting portion acquired with time shows that the driving torque has lowered so as to satisfy a predetermined condition, and in a case that discrimination that the detection result shows that the driving torque has lowered in at least one image forming portion of said plurality of image forming portions is made, said controller executes the operation in said at least one image forming portion, and wherein in the image forming portion of said plurality of image forming portions in which discrimination that the detection result does not show that the driving torque has lowered is made at the predetermined timing, said controller executes the image formation or executes another operation in which the image formation is interrupted and a voltage is not applied to said charging member or a voltage which does not generate the discharge between said charging member and said photosensitive member is applied to said charging member and in which said photosensitive member is rotated through at least one full circumference in the state in which rotation of said developing member is stopped or in the state in which said developing member is rotated at the rotational speed lower than the rotational speed during the image formation.

* * * * *